United States Patent
Jimenez

(10) Patent No.: US 10,081,117 B1
(45) Date of Patent: *Sep. 25, 2018

(54) HANDLE INCLUDING TWO HANDGRIPS AND/OR A HAND ALIGNMENT MECHANISM

(71) Applicant: EXCEPTIONAL IP HOLDINGS, LLC, Apex, NC (US)

(72) Inventor: Eduardo J Jimenez, Manalapan, NJ (US)

(73) Assignee: Exceptional IP Holdings, LLC

( * ) Notice: Subject to any disclaimer, the term of this patent is extended or adjusted under 35 U.S.C. 154(b) by 152 days.

This patent is subject to a terminal disclaimer.

(21) Appl. No.: 15/082,762

(22) Filed: Mar. 28, 2016

Related U.S. Application Data

(63) Continuation of application No. 13/692,446, filed on Dec. 3, 2012, now Pat. No. 9,296,121, which is a continuation of application No. 10/444,136, filed on May 23, 2003, now Pat. No. 8,322,040.

(51) Int. Cl.
*B27B 21/00* (2006.01)
*B25G 1/10* (2006.01)

(52) U.S. Cl.
CPC ............ *B27B 21/00* (2013.01); *B25G 1/102* (2013.01)

(58) Field of Classification Search
CPC .......... B23D 51/01; B25G 1/102; B27B 21/00
See application file for complete search history.

(56) References Cited

U.S. PATENT DOCUMENTS

| | | | |
|---|---|---|---|
| 132,258 A | 10/1872 | Dietrich |
| 152,890 A | 7/1874 | Lamb |
| 231,977 A | 9/1880 | Andrews |
| 327,776 A | 10/1885 | Eisenhart |
| 691,237 A | 1/1902 | Bush |
| 1,136,790 A | 4/1915 | Funk |
| 2,124,615 A | 7/1938 | Foltz |
| 2,390,544 A | 12/1945 | Lamb |
| D152,760 S | 2/1949 | Weaver |
| D152,890 S | 3/1949 | Lamb |
| D121,502 S | 7/1949 | Weaver |

(Continued)

FOREIGN PATENT DOCUMENTS

| | | |
|---|---|---|
| EP | 0 653 727 A1 | 5/1995 |
| GB | 907520 | 10/1962 |

*Primary Examiner* — Hwei C Payer
(74) *Attorney, Agent, or Firm* — Kevin Wolff; Wolff Law Offices, PLLC

(57) ABSTRACT

A handle having improved ergonomics and relatively compact low cost design is provided. In particular, the handle may include two hand grip areas which may be integral with one another. The two hand grips may be approximately perpendicular to one another. Further, one or both of the grip areas may include grip alignment mechanisms that improve the ergonomic alignment of a persons hand on the hand grip area of the handle. In another aspect the hand grip(s) may have smooth rounded grasping surfaces to provide comfort when grasped by a hand. The alignment mechanism(s) may be placed at an optimal location on the hand grip(s) area and result in improved control and comfort during use. In addition, one of the alignment mechanisms may serve a dual purpose of hand alignment and as a stop that prevents a person's hand from slipping off of the grip area during use.

20 Claims, 28 Drawing Sheets

(56) References Cited

U.S. PATENT DOCUMENTS

| | | |
|---|---|---|
| 2,606,368 A | 8/1952 | Ratcliff |
| 2,773,528 A | 12/1956 | Gringer |
| 3,395,765 A | 8/1968 | Schnettler |
| D217,583 S | 5/1970 | Swanson |
| D249,453 S | 9/1978 | Covey |
| D259,328 S | 5/1981 | Covey |
| 4,376,456 A | 3/1983 | Jacoff |
| D269,848 S | 7/1983 | Covey |
| 4,414,743 A | 11/1983 | Pioch et al. |
| 4,428,266 A | 1/1984 | Keddie |
| D307,383 S | 4/1990 | Huang |
| 5,044,083 A | 9/1991 | DeCarolis et al. |
| 5,146,810 A | 9/1992 | Mueller |
| 5,172,522 A | 12/1992 | Jares |
| D333,825 S | 3/1993 | Price |
| 5,327,612 A | 7/1994 | Kelsay |
| 5,332,156 A | 7/1994 | Wheeler |
| D359,672 S | 6/1995 | Gardiner |
| 5,435,294 A | 7/1995 | Williamson |
| 5,528,834 A | 6/1996 | Saber et al. |
| D395,218 S | 6/1998 | Martin |
| 5,778,747 A | 7/1998 | Chen |
| 5,855,070 A | 1/1999 | Grabowski |
| 6,122,831 A | 9/2000 | Beckers et al. |
| D440,855 S | 4/2001 | Wang |
| D442,458 S | 5/2001 | Jimenez |
| 6,266,887 B1 | 7/2001 | Owens et al. |
| 6,305,051 B1 | 10/2001 | Cho |
| D463,966 S | 10/2002 | Juhlin |
| 6,457,244 B1 | 10/2002 | Huang |
| D466,784 S | 12/2002 | Chen |
| D468,982 S | 1/2003 | Brazell et al. |
| D471,417 S | 3/2003 | Chenn et al. |
| D483,639 S | 12/2003 | Jimenez |
| D483,640 S | 12/2003 | Jimenez |
| D484,020 S | 12/2003 | Jimenez |
| D486,373 S | 2/2004 | Jimenez |
| D488,981 S | 4/2004 | Jimenez |
| D488,982 S | 4/2004 | Jimenez |
| D495,575 S | 9/2004 | Jimenez |
| D499,947 S | 12/2004 | Martin |
| D639,132 S | 6/2011 | Demers et al. |
| 8,322,040 B2 | 12/2012 | Jimenez |
| 8,555,517 B2 | 10/2013 | Scott et al. |
| 9,296,121 B1 * | 3/2016 | Jimenez ............... B23D 51/01 |
| 2002/0138931 A1 | 10/2002 | Davies |
| 2004/0074099 A1 | 4/2004 | Chen |
| 2004/0231172 A1 | 11/2004 | Jimenez |
| 2012/0324745 A1 | 12/2012 | Scott et al. |

* cited by examiner

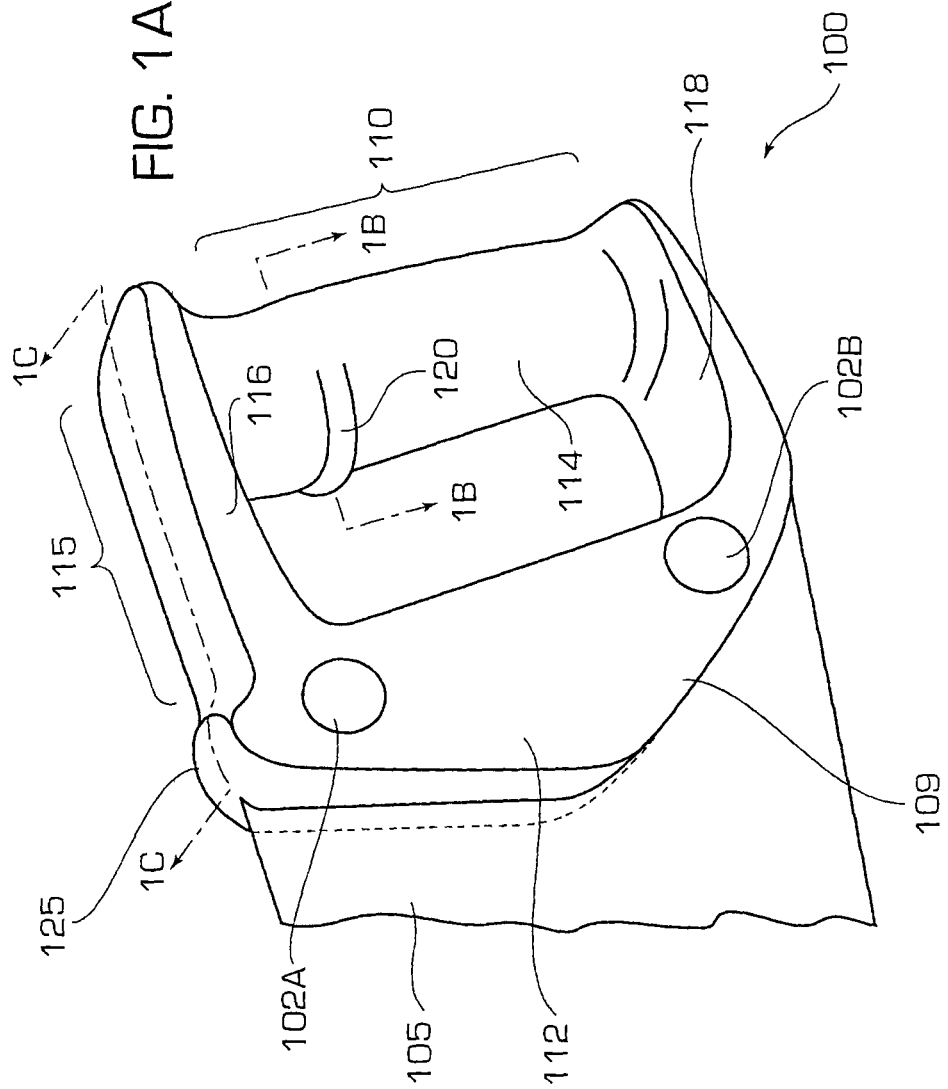

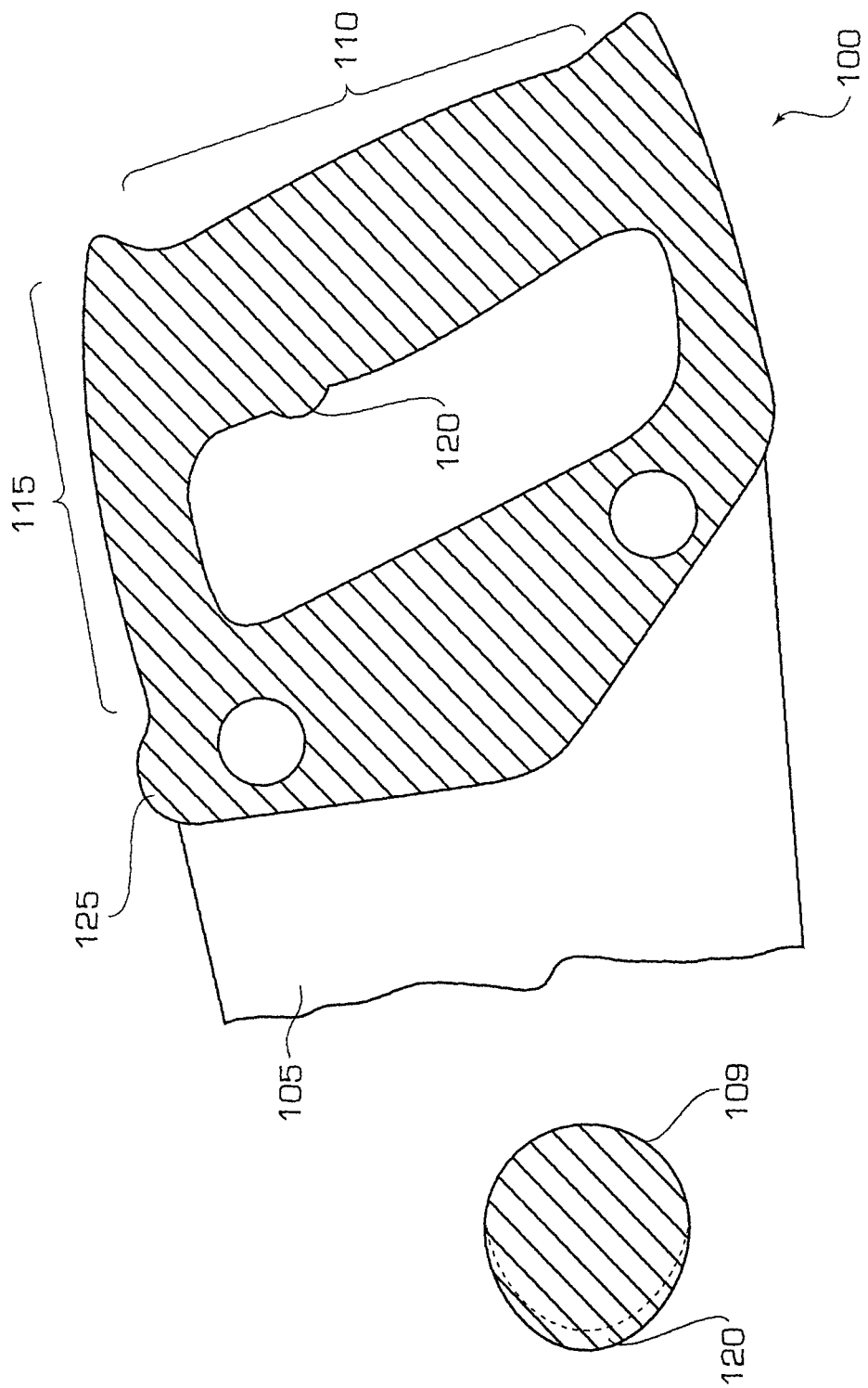

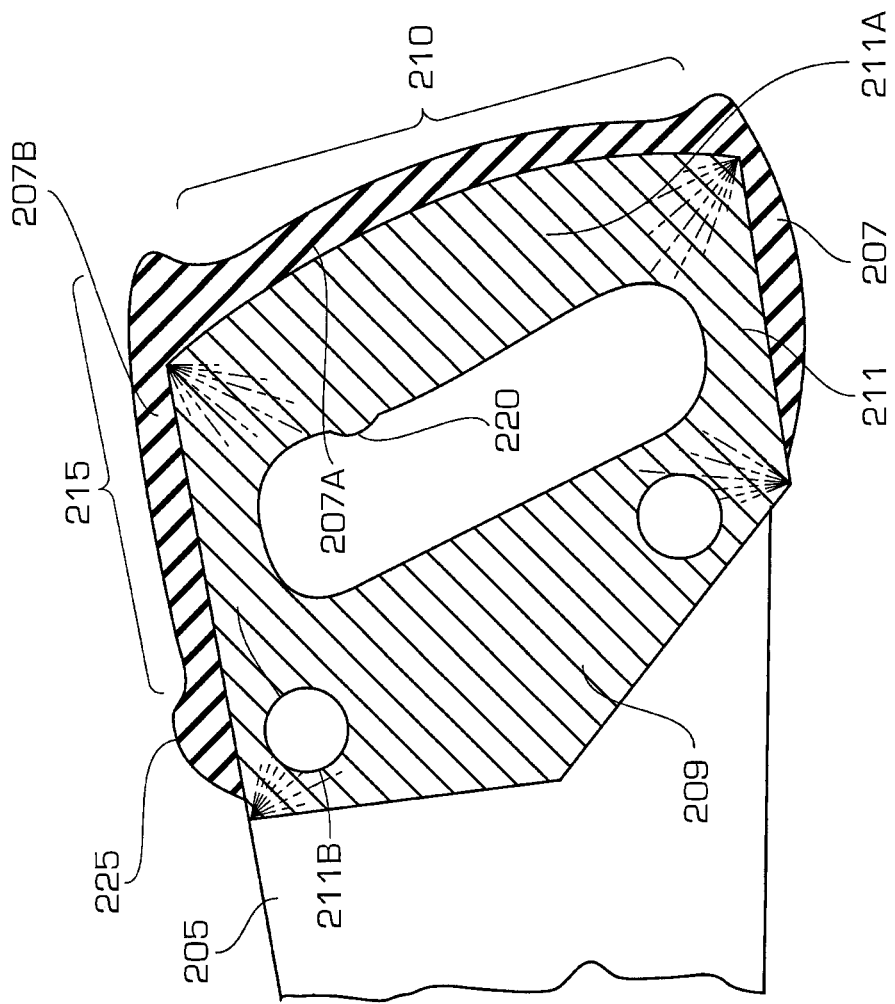
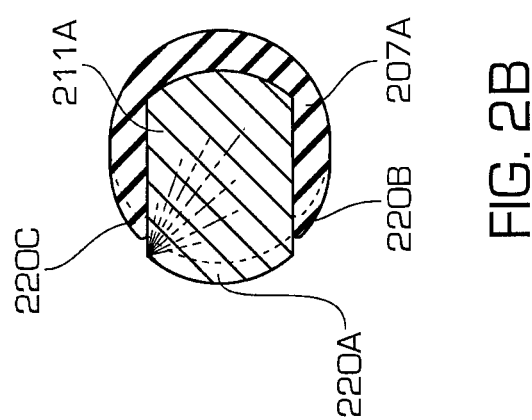
FIG. 2C
FIG. 2B

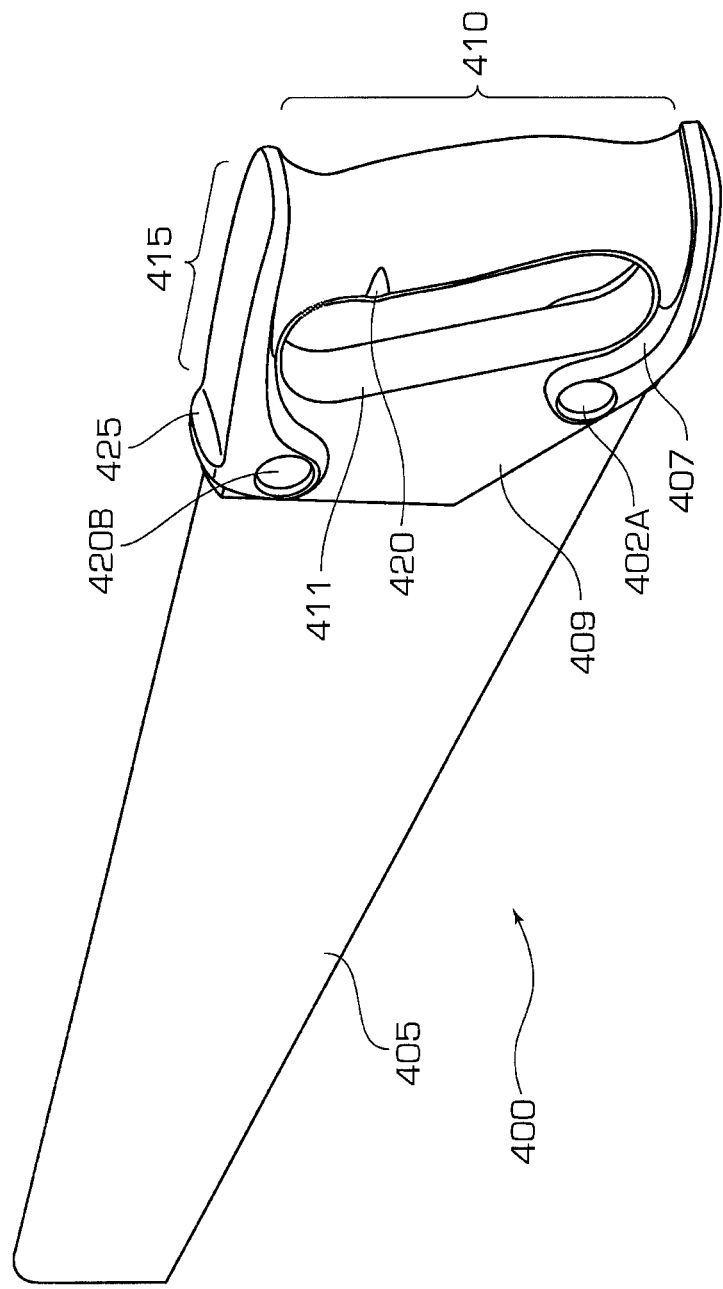

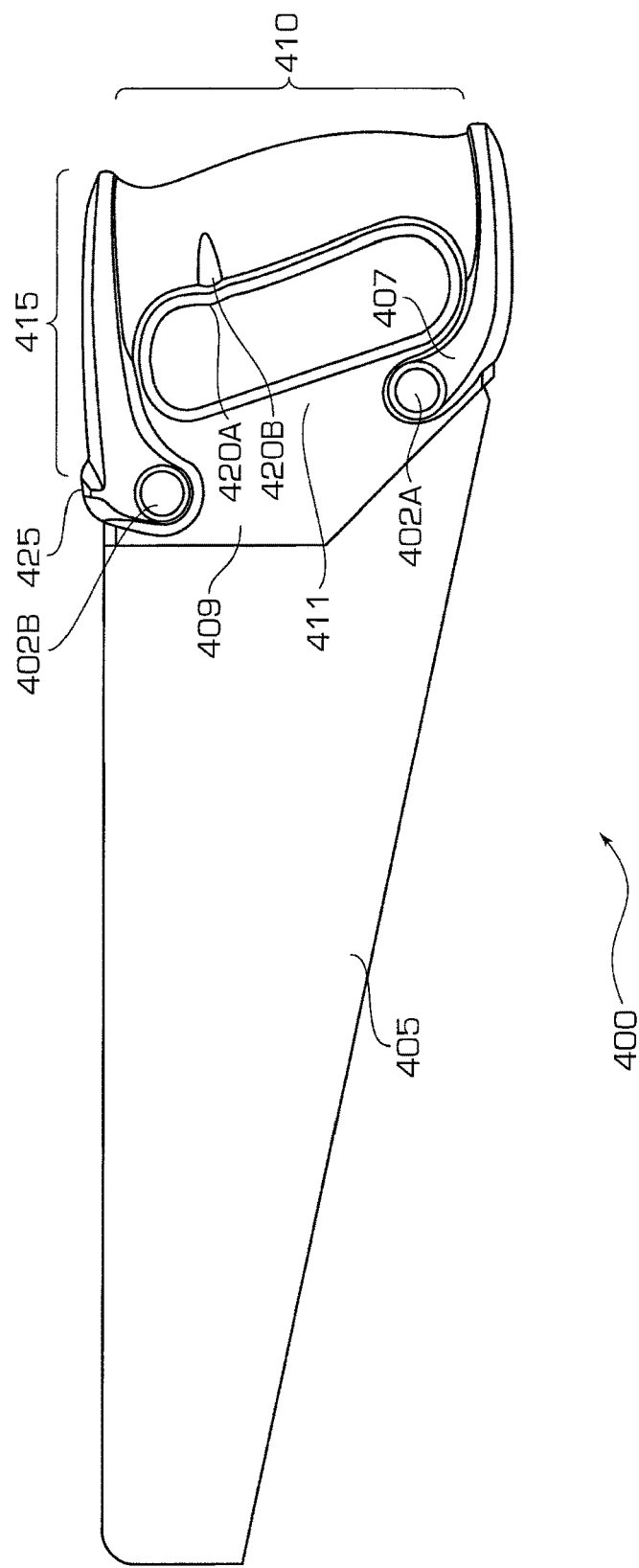

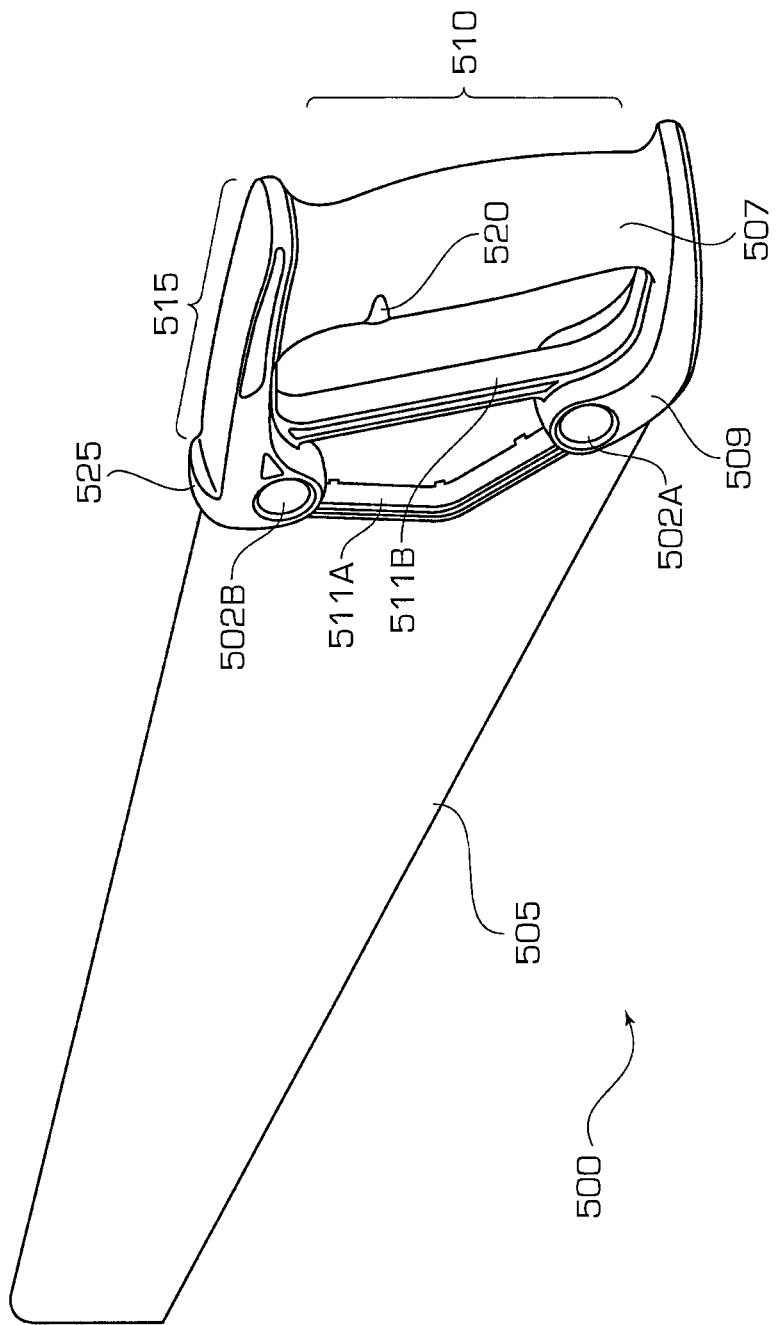

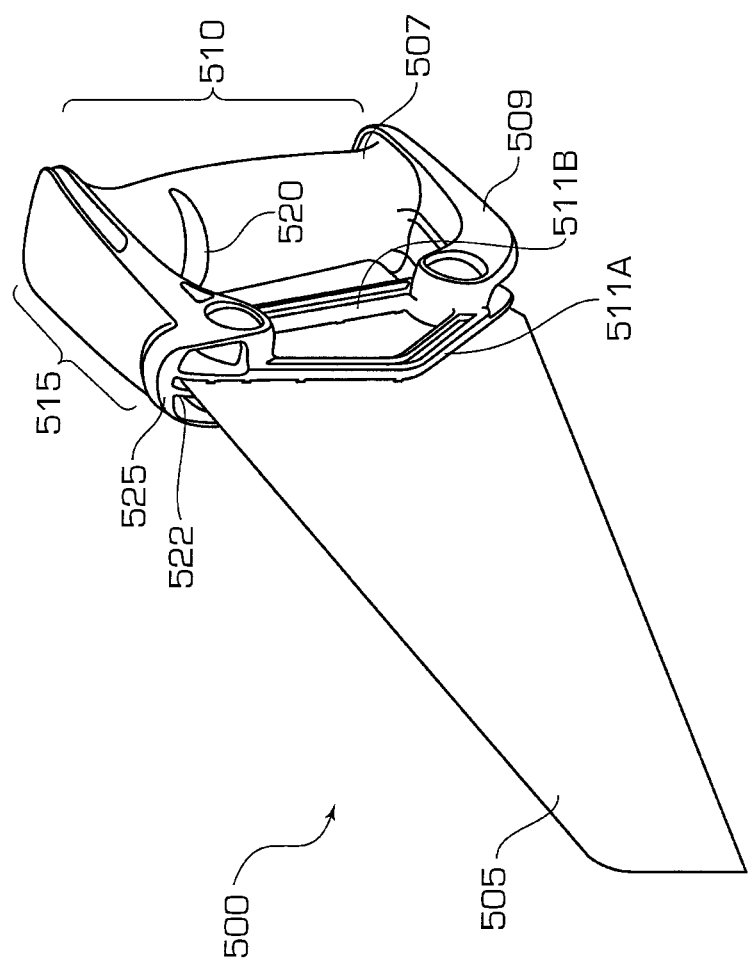

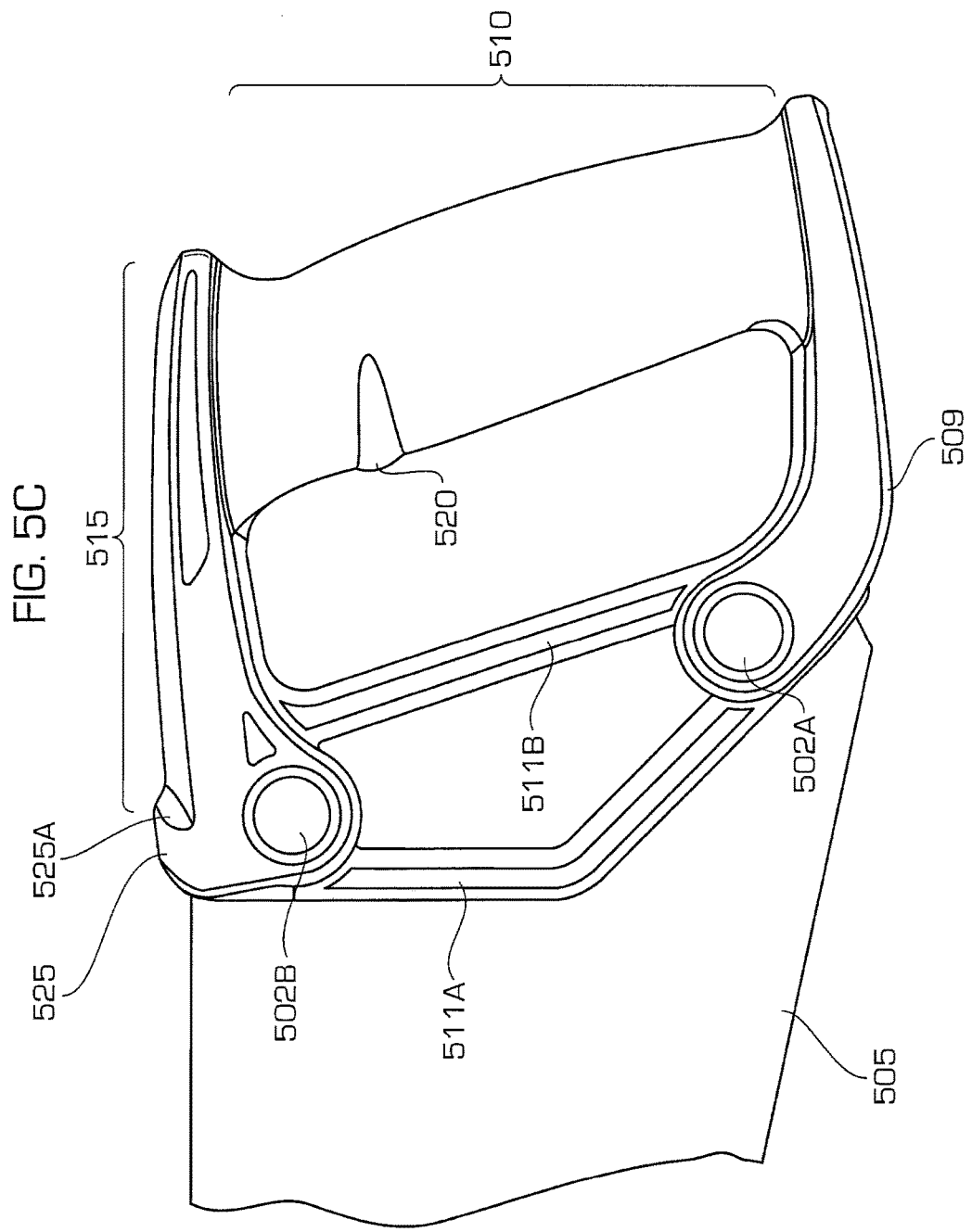

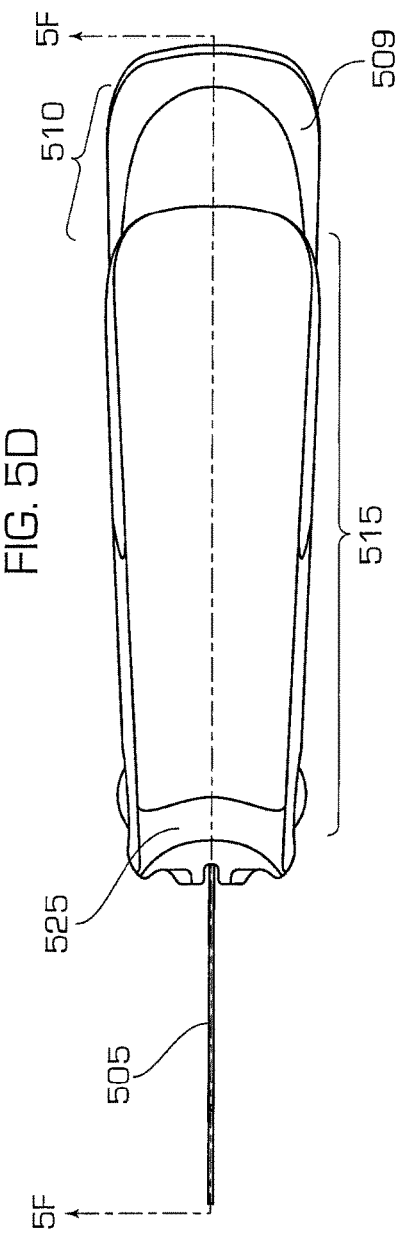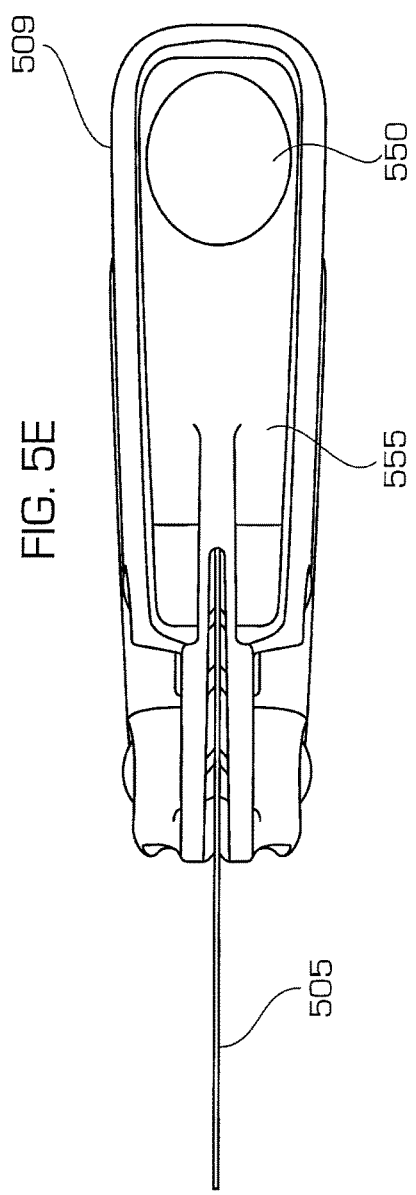

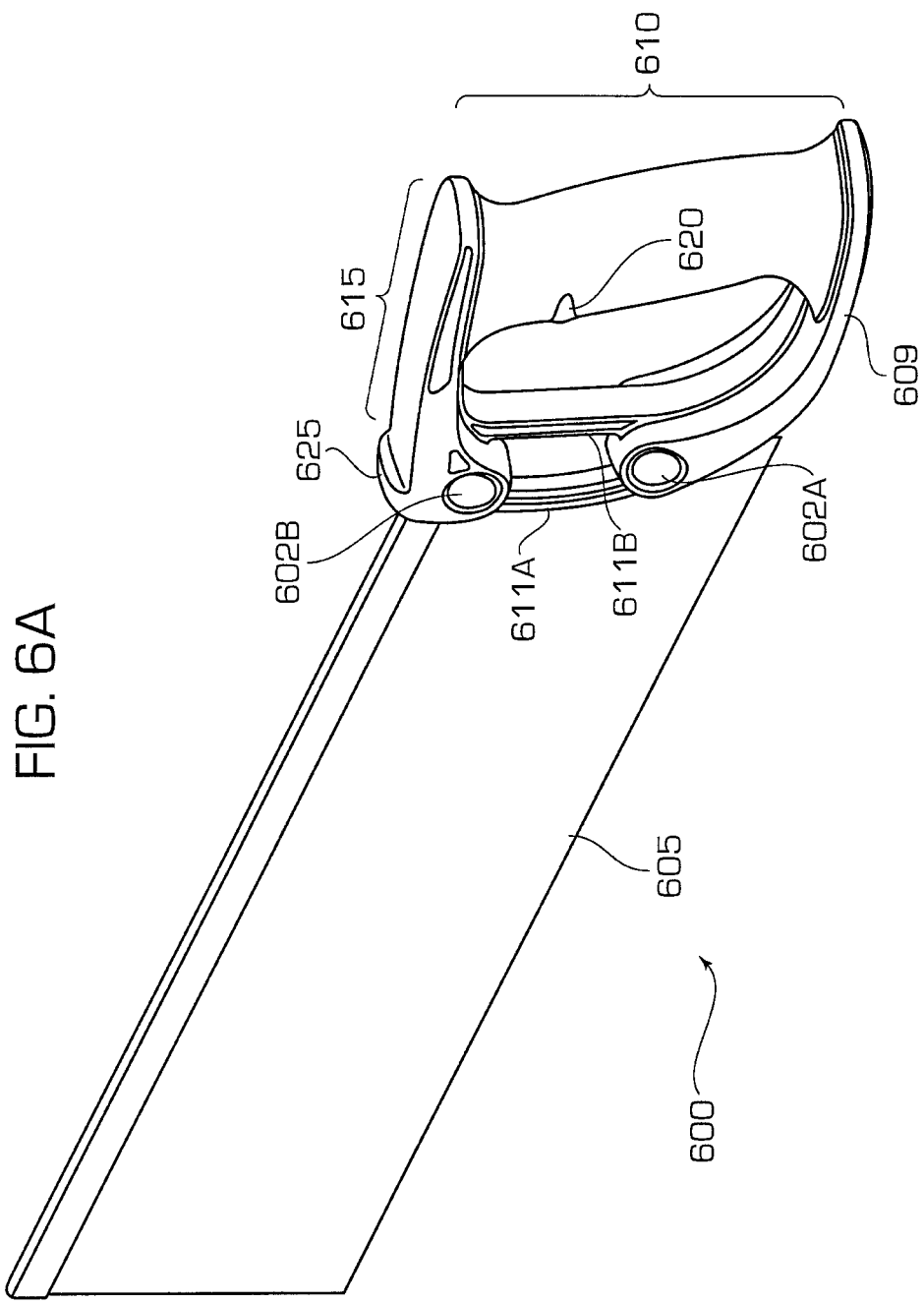

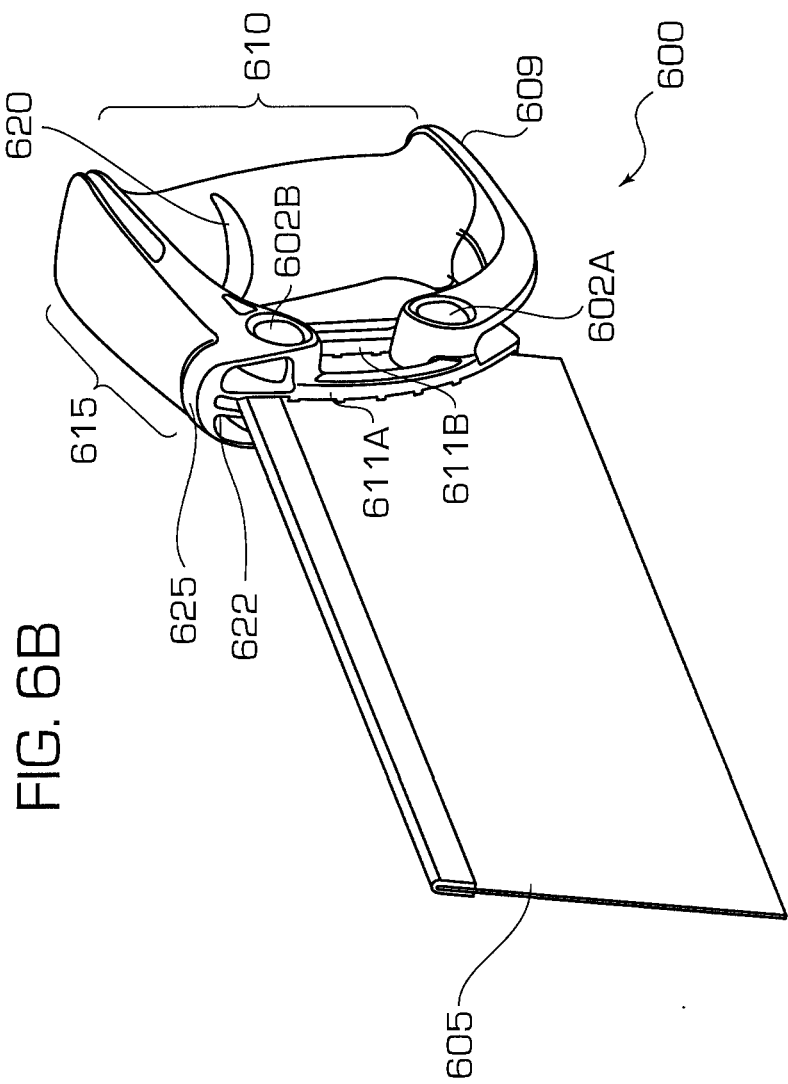

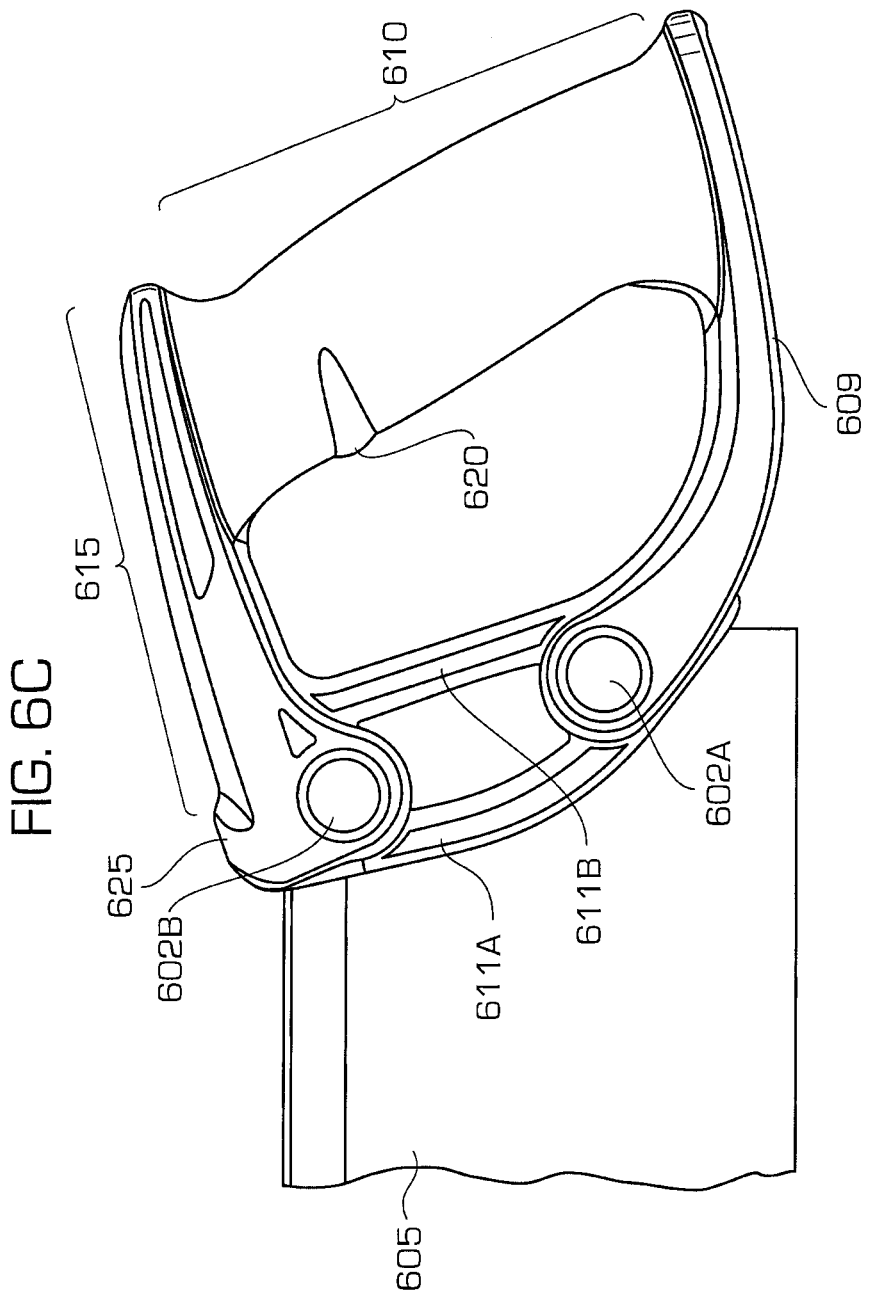

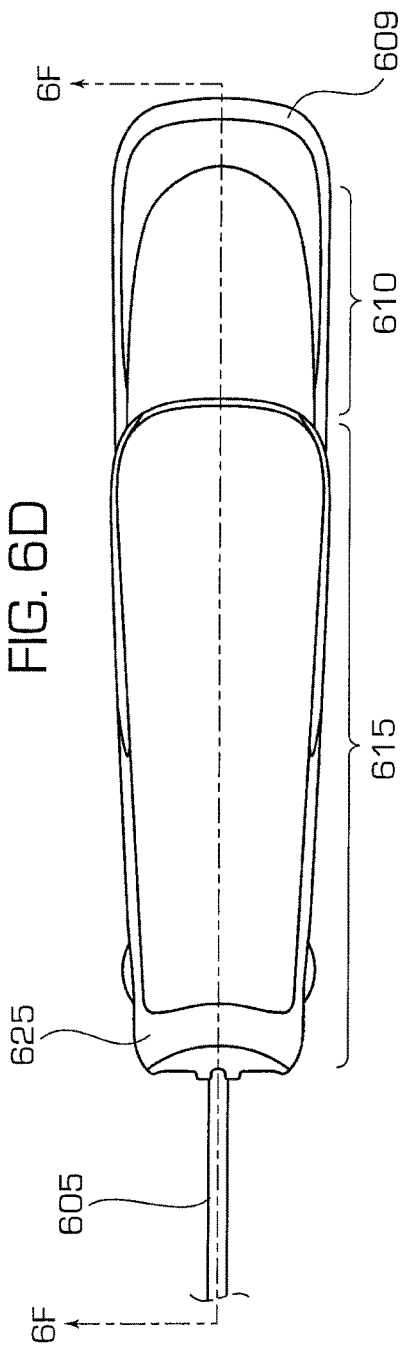
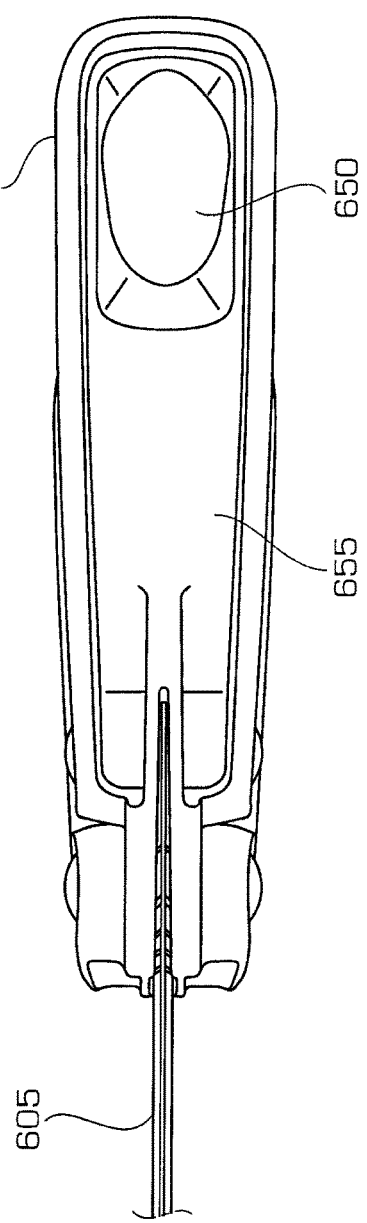

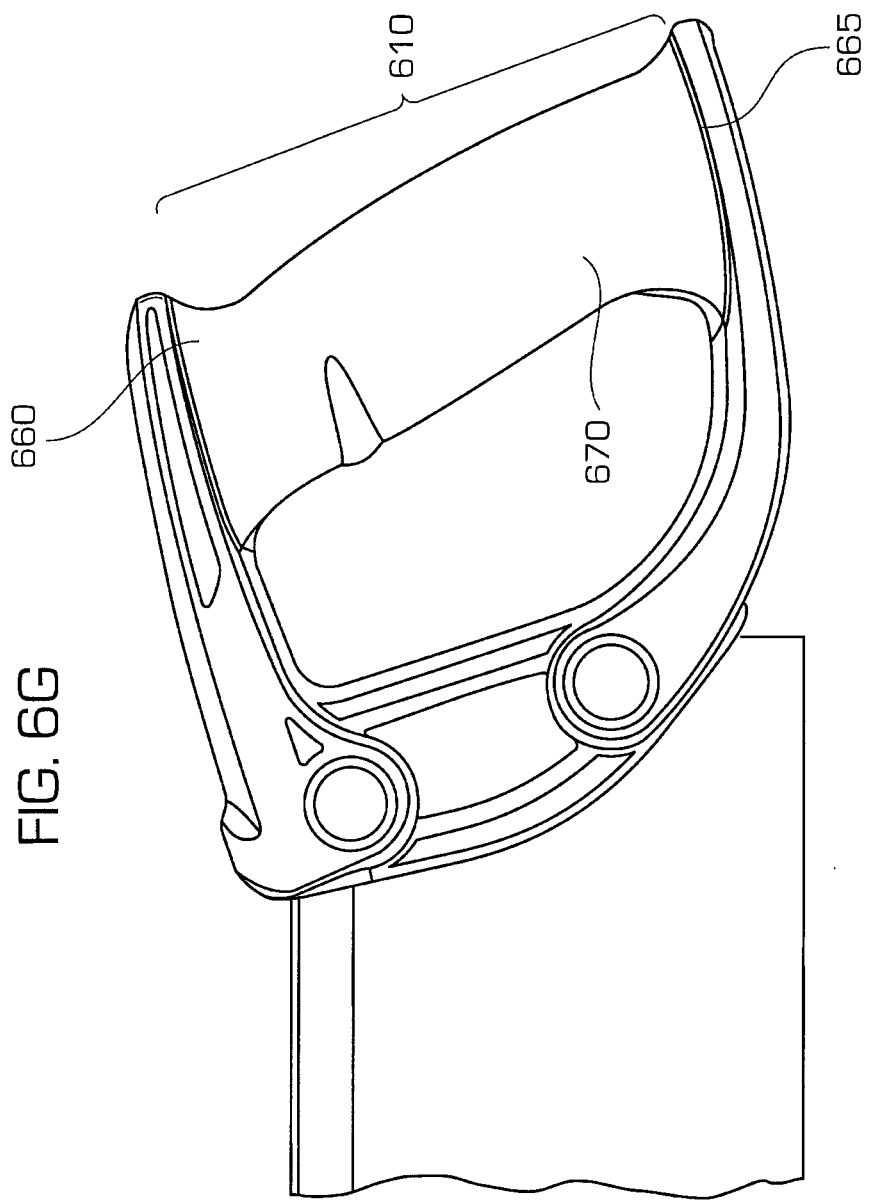

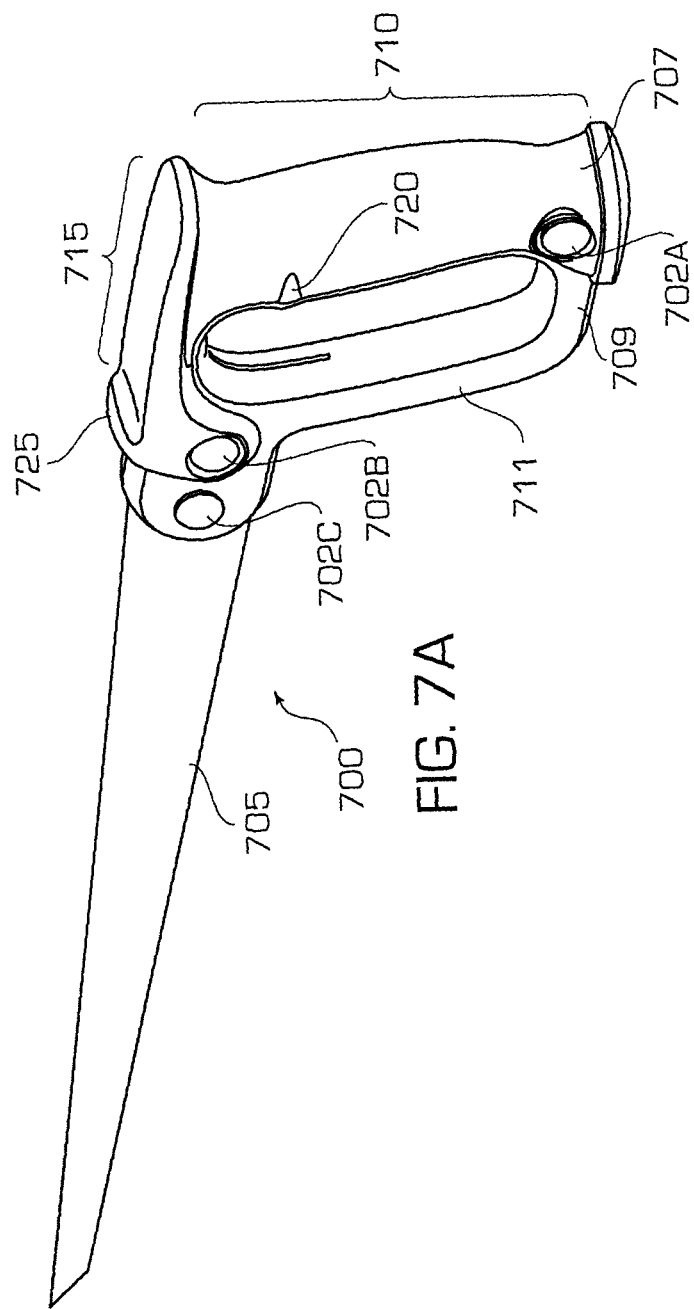

HANDLE INCLUDING TWO HANDGRIPS AND/OR A HAND ALIGNMENT MECHANISM

This application is a continuation of and claims priority to U.S. patent application Ser. No. 13/692,446, filed Dec. 3, 2012, now U.S. Pat. No. 9,296,121, which is a continuation of U.S. patent application Ser. No. 10/444,136, filed May 23, 2003, now U.S. Pat. No. 8,322,040, the entire disclosures of which are hereby incorporated by reference as if set forth fully herein.

FIELD OF THE INVENTION

The present invention pertains to a handle. In particular, the invention involves a handle with multiple handgrips and/or hand alignment mechanism(s).

BACKGROUND

Handles have been known for years and are used in numerous applications. For example, handles may be found on items as diverse as tools, equipment, buckets, vehicles, houses, windows, baskets, barrels, desks, cabinets, etc. Handles provide a convenient and useful mechanism for moving an item which it is part of or attached to, and may include some appearance and ornamental aspects. In addition, in various applications ergonomics, strength, weight, size, safety, and comfort when in use may be a consideration or attribute worth incorporating in a handle design.

Hand tools provide one particularly interesting application for handles. In hand tool applications consideration is often given to the size, strength and durability of the handle without much consideration to ergonomic, safety, and/or appearance attributes. This has been particularly true of manual or non-power hand tools given their relatively low retail prices.

SUMMARY

The present invention is directed to a handle that meets as many of the aforementioned handle attributes as possible in a relatively compact low cost design that may be used in various handle applications and particularly with manual hand tools such as a handsaw. In particular, the handle may include two hand grip areas which may be integral with one another. The two hand grips may be approximately perpendicular to one another. Further, one or both of the grip areas may include grip alignment mechanisms that improve the ergonomic alignment of a persons hand on the hand grip area of the handle. In another aspect the hand grip(s) may have smooth rounded grasping surfaces to provide comfort when grasped by a hand. The alignment mechanism(s) may be placed at an optimal location on the hand grip(s) area and result in improved control and comfort during use. In addition, one of the alignment mechanisms may serve a dual purpose of hand alignment and as a stop that prevents a person's hand from slipping off of the grip area during use.

In one embodiment the present invention is the handle for a manually operated, non-electric power, handsaw. The handsaw handle may be attached to one end of a saw blade and a primary grip may be positioned in a pistol type. The handsaw may be, for example, a panel saw, backsaw, compass saw, hack saw, etc. The primary grip may have a generally smooth and rounded shape for comfortably accommodating the fingers and palm of a hand when gripped. Further, the primary grip may include an alignment mechanism, for example a raised area or bump on the grip surface. In one variation, the alignment mechanism included in the primary grip may be placed on the grip to be located between and index finger and a middle finger of the users hand when the handle is properly grasped for operation. The raised area or bump on the grip may be of a size and height so as to be more or less concealed within the dimensions of a typical user's index finger and middle finger as the user grasps the primary grip of the handle. For example, the raised area or bump may be an elongated oval that is placed laterally across the front most surface and partially along the side surfaces of the hand grip of the handle at about one fourth of the distance down from the upper most lateral surface and lower most lateral surface of the handle. At the vertical center of the elongated oval it may have its widest portion at the base of the elongated oval raised area or bump with a width of, for example, approximately one quarter of an inch (¼") and its highest portion with a height of approximately three sixteenths of an inch (³⁄₁₆"). In a preferred embodiment the alignment mechanism on the primary hand grip portion may be formed as in integral part of the grip's outer surface(s) contour.

A secondary hand grip area may be included in the handsaw handle. The secondary hand grip area may be top surface of the handle approximately perpendicular to the primary hand grip area and integral to the primary grip area so as to be partially over the primary grip area. This secondary hand grip may provide hand support for the second hand of a user during operation of the handsaw. The secondary grip area may include an alignment mechanism located at a forward end of the secondary grip in a direction away from the primary grip (i.e., the end of the secondary grip located most close to the saw blade). The secondary alignment mechanism may be, for example, a ridge or raised area of sufficient height to reduce, minimize or prevent a second hand from slipping during use. In a preferred embodiment, the ridge or raised area may be formed approximately perpendicular with the top surface of the handle and approximately parallel to the primary grip. The ridge or raised area on the secondary grip may have a height at its highest point of approximately three sixteenth (³⁄₁₆") to one fourth (¼") of an inch and a width of approximately three eighths of an inch (⅜"). Further, the ridge or raised area may have a back surface (i.e., surface facing away from the saw blade) that is approximately perpendicular to the upper surface of the secondary grip to offer a firm surface to keep the user's hand from slipping forward onto the saw blade during use. In addition, the secondary grip may have a rounded contour side-to-side to provide comfort and control. As with the alignment mechanism of the primary hand grip portion, in a preferred embodiment the alignment mechanism on the secondary hand grip portion may be formed as in integral part of the grip's outer surface(s) contour.

The summary provided above gives a thumb nail sketch of some of the various aspects and embodiments of the present invention. The following descriptions will provide a better and more detailed understanding of the present invention. However, none of the description of the present invention provided herein is intended to be limiting, but is provided as exemplary of the various aspects and embodiments of the invention.

BRIEF DESCRIPTION OF THE DRAWINGS

The objects, features and advantages of the present invention will become more readily apparent to those skilled in the art upon reading the following detailed description, in conjunction with the appended drawings, in which:

FIG. 1A is a perspective view of a handle that depicts an exemplary embodiment of the present invention;

FIG. 1B is a cross sectional view of the handle of FIG. 1A taken across section lines 1B-1B, according to one exemplary embodiment of the present invention;

FIG. 1C is a cross sectional view of the handle of FIG. 1A taken across section lines 1C-1C, according to one exemplary embodiment of the present invention;

FIG. 2B is a cross sectional view of the handle of FIG. 2A taken across section lines 2B-2B, according to one exemplary embodiment of the present invention;

FIG. 2C is a cross sectional view of the handle of FIG. 2A taken across section lines 2C-2C, according to one exemplary embodiment of the present invention;

FIG. 4A is a perspective view of a panel saw that depicts a further exemplary embodiment of the present invention;

FIG. 4B is an elevational view of the panel saw of FIG. 4A viewed from the left side of FIG. 4A;

FIG. 5A is a perspective view of another panel saw that depicts a further exemplary embodiment of the present invention as viewed from the lower rear looking up;

FIG. 5B is a perspective view of the panel saw of FIG. 5A as viewed from the upper front looking down rear;

FIG. 5C is a partial elevational view of the panel saw of FIG. 5A viewed from the left side of FIG. 5A;

FIG. 5D is a partial top plan view of the panel saw of FIG. 5A;

FIG. 5E is a partial bottom plan view of the panel saw of FIG. 5A;

FIG. 6A is a perspective view of a back saw that depicts a further exemplary embodiment of the present invention as viewed from the lower rear looking up;

FIG. 6B is a perspective view of the back saw of FIG. 6A as viewed from the upper front looking down rear;

FIG. 6C is a partial elevational view of the back saw of FIG. 6A viewed from the left side of FIG. 6A;

FIG. 6D is a partial top plan view of the back saw of FIG. 6A;

FIG. 6E is a partial bottom plan view of the back saw of FIG. 6A;

FIG. 6G is a partial elevational view of the back saw of FIG. 6A with a variation in the grip surface as viewed from the left side of FIG. 6A;

FIG. 7A is a perspective view of a compass saw that depicts an exemplary embodiment of the present invention;

DETAILED DESCRIPTION

Figure 2A:
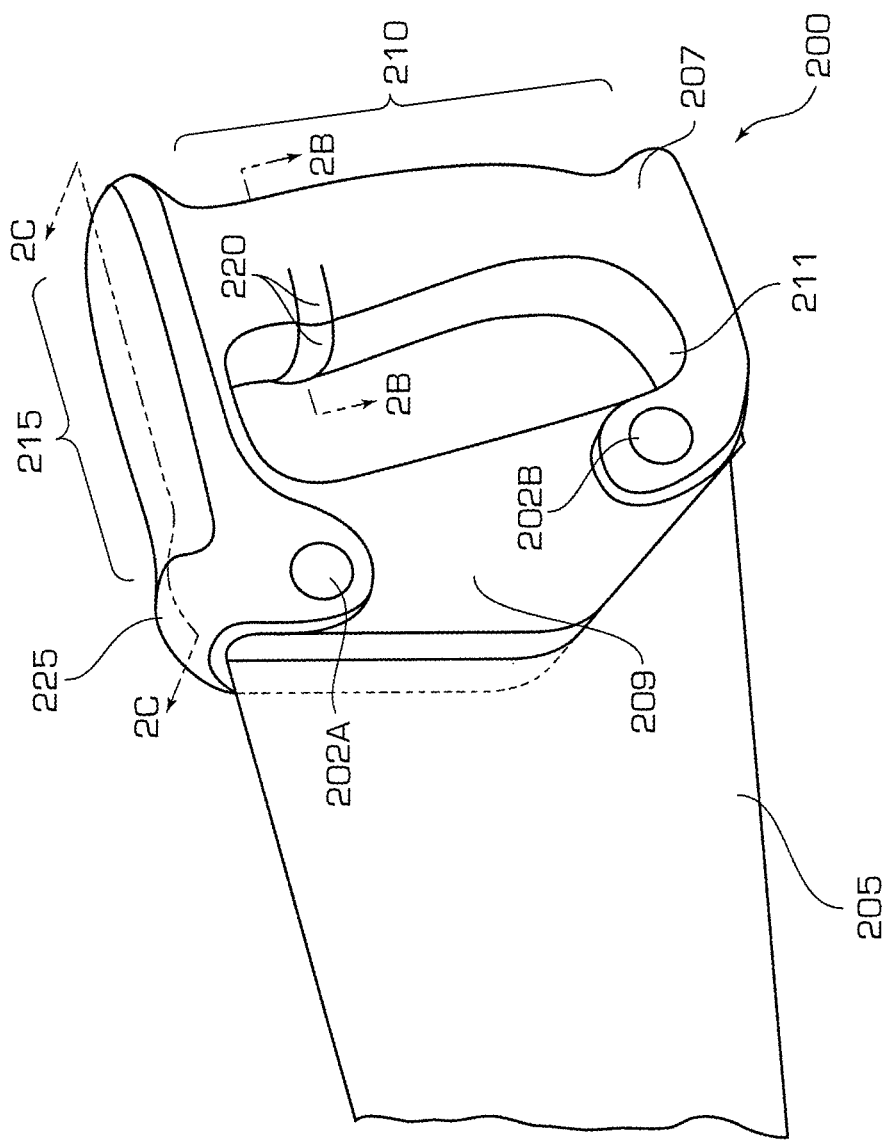
FIG. 2A is a perspective view of a handle that depicts another exemplary embodiment of the present invention.

In general, the present invention is directed to a handle design with improved appearance, cost, comfort and control during operation that may include a compact integral multi-grip arrangement and/or ergonomic alignment for a persons hand(s) on one or more hands. For example, the hand grip(s) area(s) of the handle may include one or more hand alignment mechanisms for improved comfort and control when using the handle to move or control the movement of an object. The alignment mechanism(s) may be placed at an optimal location on the hand grip(s) area so as to attain maximum control and comfort during use. Further, the handle may have either one grip area or two grip areas, e.g., a primary grip and a secondary grip, that are integral to one another. The secondary hand grip may overlap at least a portion of the primary hand grip. The grip alignment mechanism may be place on either one or both of the two grip areas. The grip alignment mechanism may be a raised area, bump, or ridge having at least one of a number of shapes. In one embodiment, a primary grip area may be formed approximately perpendicular with the primary direction or plane of motion of the handle when in use. The alignment mechanism may be a finger segregation bump that is placed on the hand grip area so as to comfortably fit into the area between a user's index finger and middle finger when the hand grip is properly grasped by a user for actuation. In other embodiments the alignment mechanism or finger segregation bump may be located so as to be between one or more of the other fingers on the user's hand and there may be more than one such alignment mechanism on the hand grip area (e.g., one finger segregator between the index finger and the middle finger and one finger segregator between the middle and third finger.) The alignment mechanisms may be located along the grip area at a location that provides improved comfort and control when the handle is properly grasped. In one preferred embodiment(s) the alignment mechanism(s) are of a height, e.g., ⅛-¼ inch, from the normal surface of the grip area, is less than half the thickness of a user's finger (e.g., ⅜ inch) so as to fit comfortably in the valleys formed between a user's fingers when a gripping or fist action is performed around the grip area and the height.

In addition, the handle may include two hand grip areas, a primary and a secondary hand grip area. In one embodiment, at least the secondary hand grip are may include a hand alignment mechanism. This alignment mechanism may serve a dual purpose of hand alignment and as a stop that prevents a person's hand from slipping off of the grip area during use. The alignment mechanism may be a bump or ridge that protrudes from the outer planar surface of the secondary hand grip area. In one embodiment, the grip alignment mechanism may be located near where the handle connects to an instrument or item to which the handle is attached. Thus, in the case when the secondary hand grip area is integrally formed with a primary hand grip area and approximately perpendicular therewith, the secondary hand grip alignment mechanism may be located toward the far end of the secondary hand grip, away from the primary hand grip. Although the secondary hand grip alignment mechanism may be relatively short in height from the secondary hand grip top surface plane that accommodates a user's hand, in a preferred embodiment the secondary hand grip alignment mechanism may be a ridge that is of sufficient height and abruptness (e.g., a 90 angle from the top plane of the secondary hand grip area) so as to prevent a user's hand from sliding in at least a motion pushing away from a user.

In the case where the handle may include two hand grip areas, the two hand grips may be integral with one another and may be approximately perpendicular to one another while being in the same or approximately the same vertical plane. Further, in this case one or both of the two grip areas may include grip alignment mechanisms that improve the ergonomic alignment of a persons hand on the hand grip area of the handle. In another aspect one or more of the hand grips may have smooth rounded grasping surfaces to provide comfort when grasped by a hand. In any case, a number of particular detailed embodiments follow that will give a better appreciation of the invention of the subject application.

Referring now to FIG. 1A, a partial perspective view 100 of an item or object 105 and an attached handle 109 make up a first detailed embodiment of the invention. The handle 109 is coupled to a device, item, object, or utensil 105 (partially shown) to which movement is desired. The object may be in some cases nothing more than a mounting bracket for connecting the handle to another, perhaps larger, item. The object 105 to be moved may be connected to the handle 109 by, for example, connection means 102A and 102B, for example screws, bolts, and/or rivets. The handle 109 is in a preferred embodiment a saw handle but may be any type of a handle intended to be gripped by one or more human hands for the purpose of moving an object. The object 105 to which movement is desired is in some preferred embodiments a saw blade. Although not shown, the right side may be a mirror image of the left side of the handle.

The handle 109 may have an approximately vertical front member 112 for mounting the handle to an object 105 and an approximately vertical rear member 114 for being gripped by at least one user hand. Further, the handle may have an approximately horizontal upper member 116 and an approximately horizontal bottom member 118 that connects the front member 109 and rear member 114 together. In one variation the front member 109 and the rear member 114 may be approximately parallel to one another and the upper member 116 and the lower member 118 may be approximately parallel to one another. Further, in one variation the upper member 116 may be approximately perpendicular to the rear member 114. Although the angle between the upper member 116 and the rear member 114 may be in a range from, for example, approximately 75 to 110 degrees, as would be appropriate for comfortable use of the handle in a particular application. In one variation the handle 109 comprising the front vertical member 109, rear vertical member 114, upper horizontal member 116 and lower horizontal member 118 form approximately a parallelogram and provide an opening or hand insertion hole in its center into which a user's hand or hands may be inserted during use. Further, the handle 109 may be made of a single material, for example, wood, metal, plastic, and the various front, rear, upper, and lower members may be integrally associated one to the other or coupled together with various means. Although in this embodiment the front member 112 has a triangular shape, it may have any one of a number of regular or irregular shapes such as curved outward, curved inward, straight or even be separated into two independent halves not touching together.

In any case, the rear member 114 may include a primary grip area 110 for being gripped by a user's first hand during use. The primary grip area 110 may have a rounded or cylindrical shaped outer surface that may be somewhat thicker in the middle and thinner at the ends so as to fit comfortably in the gripping hand of a user. Further, the upper member 116 may include a secondary grip area 115 for being gripped by, for example, a user's second hand during use. The secondary grip area 115 may be somewhat flat on its upper surface having mild curvature in both the lateral directions to comfortably support the palm of a user's second hand.

In one variation, the rear member 114 may include a grip alignment mechanism 120 that may be a raised area or bump on part of the surface of the primary grip area 110. The raised area or bump 120 may be largest on the forward portion of the rear member 114, facing the reward facing surface of the front member 112, and slowly reduce in size until fading into the normal rounded surface toward the rearward portion of the rear member 114. The grip alignment member 120 may be formed integrally with the material (e.g., wood, plastic, metal, ceramic, etc.) making up the primary grip area 110 and rear member 114, or be a separate piece couple to them, e.g., adhesively attached to the outer surface of the primary grip area 110.

An illustration of the dimensional aspect of the grip alignment mechanism 120 are further shown in the cross-section figures taken across line 1B-1B as shown in FIG. 1B and taken across line 1C-1C as shown in FIG. 1C. As illustrated in FIG. 1B, the bump may have a curved or circular outer surface that encompasses approximately 180 degrees of the cross-section of the primary grips circular circumference and go from a maximum height dimension (e.g., from $1/16"$ to $3/8"$ distance from the normal surface of the hand grip outer forward surface) at its mid-section (90 degrees) and a minimum height dimension at its ends (0 and 180 degrees). In this case, the bump or area may have a rounded surface as more clearly illustrated in the cross-section of FIG. 1C as taken across line 1C-1C. Although the bump shown in the present embodiment shows a relatively small and smooth circular cross-section shape, alternative shapes, dimensions and designs for the grip alignment mechanism are possible, and may include for example, a concave shape, a crescent shape, a triangular shape, a double concave side ramp, an elongated bump that has a height greater than its width, a square, a rectangular shape, etc., and may span more or less than 180 degrees around the outer surface of the primary hand grip having a single of multi-part length. (Ed: Please identify other shapes that might be possible.) Ideally, the shape and dimension of the alignment mechanism are large enough to sufficiently assist in placement of a users hand on the primary hand grip and small enough to fit comfortably in a users hand when grasping the primary hand grip. In this embodiment the hand alignment mechanism is located on the primary hand grip area 110 to be at approximately $1/4$ to $1/3$ the total length of the primary hand grip area 110 so as to be located between the index and middle finger of a user's hand upon gripping the handle 109. Of course, one or more similar or different hand alignment mechanisms may be place on the primary hand grip area to segregate other fingers on the user's hand or to abut the outer surface of the user's index or pinky finger when gripped and properly align the user's hand to a location on the primary grip area 110 which provides better comfort and control of the handle 109 during use.

The handle may have multiple hand grip areas that may be made more compact by locating them close to one another.

For example, at least a portion of the secondary hand grip area 115 may overlap at least a portion of the primary hand grip area 110. As best illustrated in FIGS. 1A and 1C, the top end of primary hand grip area 110 may be overlapped by the rear end of secondary hand grip area 115.

The secondary hand grip area 115 may also have one or more hand alignment mechanisms 125. The hand alignment mechanism 125 may be, for example, a bump or ridge located at one end of the secondary hand grip. In the embodiment illustrated in FIGS. 1A-1C, the hand alignment mechanism 125 is located on the forward end of the secondary hand grip 115 approximately over the forward member 112. However, it may be locate in other locations, such as the rear end of the secondary hand grip 115 approximately over the rear member 114, and need not be at the very end of the secondary hand grip 115. In any case, in operation the hand alignment mechanism may be placed along the secondary hand grip 115 at a location so that the outer edge of the user's hand next to the pinky finger (when located at the forward location illustrated in FIGS. 1A-1C) or the outer edge of the user's hand next to the index finger (when located in the rearward location) rests against the hand alignment mechanism's 125 inner edge while the palm of the user's hand is resting on the secondary hand grip area's 115 top surface. As one skilled in the art would appreciate, the location of the hand alignment mechanism is placed to provide proper location of a user's hand for improved comfort and control when grasping and moving the handle 109, and as a result the object or item 105 to which the handle 109 is attached. In another aspect, the hand alignment mechanism 125 may act as an obstruction to keep the user's hand from slipping laterally along and/or off the secondary hand grip 115 during use as the handle 109 and object 105 are moved laterally.

As illustrated in the embodiment of FIGS. 1A-1C, the hand alignment mechanism 125 on the secondary hand grip 115 may be a somewhat larger protrusion, bump, or ridge than the hand alignment mechanism 120 of the primary hand grip 110. This is useful when the hand alignment mechanism is to help obstruct a user's hand from lateral movement on the handle 109 during use. As best understood from FIG. 1C, the alignment mechanism may have a curved profile with a sloped angle of approximately 35 to 65 degrees from the top surface of the secondary hand grip area 115 with a height of approximately ⅛-⅜ inches and a length of ½-¾ inches. Of course, the more abrupt the angle the hand alignment mechanism's 125 outer surface has from the secondary hand grip's 115 top surface, up to 90 degrees, the greater will be the ability of the structure to restrict a user's hand from lateral slippage during use. On the other hand, the greater the angle, the less comfortable it may feel on the side of a user's hand. As such, the angle and contour of the surface of the alignment mechanism 125 may be carefully designed to achieve as best as possible a comfortable yet as much as possible, slip free construction to minimize as possible grip slipping during use. Further, as can be best seen from FIG. 1A, the angled surface of the hand alignment mechanism 125 may have a slight side to side curvature for a more comfortable fit on the user's hand. As shown in this embodiment, the hand alignment mechanism may also have approximately the same width, for example ¾ to 1¼ inches, as the handle's upper member 116 and forward member 112. Finally, as with the alignment mechanism 120 on the primary grip area 110, the alignment mechanism 125 may be formed integrally with the material of the upper member 116 and secondary hand grip area 115 or be securely affixed thereto using a connecting means, for example, adhesive, screws, etc.

Thus, as illustrated in the embodiment of FIGS. 1A-1C, the handle 109 may be made of a single integral material and include two hand grip areas, a first hand grip area 114 and a second hand grip area 115, each including a hand alignment mechanism, first hand alignment mechanism 120 and second hand grip alignment mechanism 125, respectively, that are integrally formed from the single material. However, multiple types of materials may be used in various configurations. For example, the first hand grip area 110 may be made of, for example, a plastic material covered with a rubber outer sheath and the first hand alignment mechanism 120 could be formed integral with the rubber outer sheath, while the rest of the handle 109, including the second hand grip area 115 and second hand alignment mechanism 125 could be integrally formed of a different material, for example, a wood or metal. Alternative, as show in the following detailed example, the handle 109 may be made of two layers, where one of layer overlays at least part of another layer so as to have multi-layered hand grip areas.

Referring now to FIGS. 2A-2C, a second detailed embodiment is illustrated and will now be described. This embodiment provides a multiple layer approach to form the handle 109. However, this detailed embodiment is similar in many aspects with the first detailed embodiment of FIGS. 1A-1C, so the following description will focus primarily on the additional aspects.

In FIG. 2A a partial perspective view 200 of an item or object 205 and an attached handle 209 make up a second detailed embodiment of the invention. The handle 209 may be coupled to a device, item, object, or utensil 205 (partially shown) to which movement is desired. The object 205 to be moved may be connected to the handle 209 by, for example, connection means 202A and 202B, for example screws and/or rivets. However, in this embodiment the connection means 202A and 202B may also hold an overlay portion 207 in place over an underlying handle structure or core handle structure 211 for the handle 209. The underlying handle structure 211 may be made of a one material, for example wood, metal, plastic, ceramic, etc., while the overlay portion 207 may be made of another material, for example rubber, plastic, foam, cloth, etc. The handle 209 may be, for example, a saw handle but may be any type of a handle intended to be gripped by one or more human hands for the purpose of moving an object. The object 205 to which movement is desired may be, for example, a saw blade.

In this embodiment the handle 209 may again be made up of four member portions forming a parallelogram and have an angle between the upper horizontal member and the rear vertical member in a range from, for example, approximately 75 to 110 degrees, as would be appropriate for comfortable use of the handle in a particular application. The parallelogram may form an opening or hand insertion hole in its center into which a user's hand or hands may be inserted during use. The rear vertical member may include a primary grip area 210 for being gripped by a user's first hand during use. As best illustrated in FIG. 2C, the primary grip area in this case is comprised of an overlay portion 207A and a core area 211A. The overlay portion 207A may fit snuggly to the core structure 211A and may in one variation be adhesively attached to the core structure 211A. The primary grip area 210 may have a rounded or cylindrical shaped outer surface that may be somewhat thicker in the middle and thinner at the ends so as to fit comfortably in the gripping hand of a user. Further, the upper horizontal member may include a secondary grip area 215 for being gripped by, for example, a user's second hand during use. The secondary grip area 215 may be comprised of an overlay portion 207B and a core area 211B. The overlay portion 207B may fit snuggly to the core structure 211B and may in one variation be adhesively attached to the core structure 211A. The secondary grip area 215 may be somewhat flat on its upper surface having mild curvature in both the lateral directions to comfortably support the palm of a user's second hand. Although not shown, the right side may be a mirror image of the left side of the handle.

In one variation, the primary hand grip area 210 may include a grip alignment mechanism 220 that may be a raised area or bump on at least part of the surface of the primary grip area 110. In this case the grip alignment mechanism may be formed in two separate portions, one formed on the core area 211A and another portion formed on the overlay portion 207A of the handle 209. As take together, the two portions of grip alignment mechanism 220 may be comparable in size, shape, location, appearance, and feel of the single section hand alignment mechanism 120 of the first embodiment. As such, the raised area or bump 220 may be largest on the forward portion of the primary hand grip area 210 which is facing inward to user hand insertion hole and may be formed integral to the core area 211A. As best illustrated in FIG. 2B, the first portion of the grip alignment mechanism 220 may span approximately the entire forward face of the core area 211A. The second portion of the grip alignment mechanism 220 has two sides, 220B and 220C, formed along either side of the primary grip area, integral with the overlay portion 207A, and slowly reduce in size until fading into the normal rounded side surfaces toward the rearward portion of the overlay portion 207A. Thus, in this embodiment the grip alignment member 220 may be formed integrally with two different materials, e.g., the inner core 211A may be, for example, wood while the outer overlay 207A may be, for example, rubber. Although, the materials of the core and overlay may be the same, may be integrally formed, and the alignment mechanism may be a separate piece couple to them, e.g., adhesively attached to the outer surface of the primary grip area 210.

The dimensional aspect of the grip alignment mechanism 220 in the second embodiment may be the same as those for the grip alignment mechanism 120 of the first embodiment, although segregated in three sections 220A, 220B, and 220C. These dimensions are best understood from the cross-section diagrams taken across line 2B-2B as shown in FIG. 2B and taken across line 2C-2C as shown in FIG. 2C. As illustrated in FIG. 2B, the combined bump areas may have a curved or circular outer surface that encompasses approximately 180 degrees of the cross-section of the primary grip area's 210 circular circumference and go from a maximum height dimension (e.g., from $\frac{1}{16}$" to $\frac{3}{8}$" distance from the normal surface of the hand grip core 211A outer forward surface) at its frontal mid-section 220A and a minimum height tapered dimension at its sides 220B and 220C. In this case, the bump or area may have a rounded surface as more clearly illustrated in the cross-section of FIG. 2C. Although the bump shown in the present embodiment shows a relatively small and smooth circular cross-section shape, alternative shapes, dimensions and designs for the grip alignment mechanism 220 are possible, and may include for example, a triangular shape, an elongated bump that has a height greater than its width, a concave shape, a crescent shape, a triangular shape, a double concave side ramp, an elongated bump that has a height greater than its width, a square, a rectangular shape, etc., and may span more or less than 180 degrees around the outer surface of the primary hand grip area 210. Ideally, the shape and dimension of the alignment mechanism are large enough to sufficiently assist in placement of a users hand on the primary hand grip area 210 and small enough to fit comfortably in a users hand when grasping the primary hand grip area 210. In this embodiment the hand alignment mechanism 220 is located on the primary hand grip area 210 to be at approximately $\frac{1}{4}$ to $\frac{1}{3}$ the total length of the primary hand grip area 210 so as to be located between the index and middle finger of a user's hand upon gripping the handle 209. Of course, one or more similar or different hand alignment mechanisms may be place on the primary hand grip area 210 to segregate other fingers on the user's hand or to abut the outer surface of the user's index or pinky finger areas when gripped and properly align the user's hand to a location on the primary grip area 210.

The handle 209 may have multiple hand grip areas that may be made more compact by locating them close to one another. For example, at least a portion of the secondary hand grip area 215 may overlap at least a portion of the primary hand grip area 210. As best illustrated in FIGS. 2A and 2C, the top end of primary hand grip area 210 may be overlapped by the rear end of secondary hand grip area 215.

The secondary hand grip area 215 may also have one or more hand alignment mechanisms 225. The hand alignment mechanism 225 may be, for example, a bump or ridge located at one end of the secondary hand grip 215. In the embodiment illustrated in FIGS. 2A-2C, the hand alignment mechanism 225 is located on the forward end of the secondary hand grip 215 over the forward most section of the handle 209 close to the object 205 to which the handle 209 is attached. However, it may be locate in other locations, such as the rear-most end of the secondary hand grip 215 above the rear vertical member and the primary hand grip area 210, and need not be at the very end of the secondary hand grip 115. In this embodiment, the shape and contour of the hand alignment mechanism 225 may be integrally form with the outer overlay portion 207B material. As such, to formation of the core portion 211 of the handle may be simplified in the core portion area 211B, so as to have a relatively flat top surface. However, the shape and contour of the hand alignment mechanism 225 may be formed integral to the core portion 211B or added thereto and the overlay portion 207B could simply be conformal thereto and take the shape or contour or the underlying hand alignment mechanism 225 bump or ridge.

In any case, the hand alignment mechanism 225 may be placed along the secondary hand grip 215 at a location so that during operation the outer edge of the user's hand next to the pinky finger (when the hand alignment mechanism 225 is located at the forward location illustrated in FIGS. 2A-2C) or the outer edge of the user's hand next to the index finger (when the hand alignment mechanism 225 is located in the rearward location) rests against the hand alignment mechanism's 225 inner edge while the palm of the user's hand is resting on the secondary hand grip area's 215 top surface. As one skilled in the art would appreciate, the location of the hand alignment mechanism is placed to provide proper location of a user's hand for improved comfort and control when grasping and moving the handle 209, and as a result the object or item 205 to which the handle 209 is attached.

In another aspect, the hand alignment mechanism 225 may act as an obstruction to keep the user's hand from slipping laterally along and/or off the secondary hand grip 215 during use as the handle 209 and object 205 are moved laterally. As illustrated in the embodiment of FIGS. 2A-2C, the hand alignment mechanism 225 on the secondary hand grip 215 may be a somewhat larger protrusion, bump, or ridge than the hand alignment mechanism 220 of the primary hand grip 210. This is useful when the hand alignment mechanism is to help obstruct a user's hand from lateral movement on the handle 209 during use.

As best understood from FIG. 2C, the alignment mechanism may have a curved profile with a sloped angle of approximately 35 to 65 degrees from the top surface of the secondary hand grip area 215 with a height of approximately ⅛-⅜ inches and a length of ½-¾ inches. Of course, the more abrupt the angle the hand alignment mechanism's 225 outer surface has from the secondary hand grip's 215 top surface, up to 90 degrees, the greater will be the ability of the structure to restrict a user's hand from lateral slippage during use. Further, as can be best seen from FIG. 2A, the angled surface of the hand alignment mechanism 225 may have a slight side to side curvature for a more comfortable fit on the user's hand. As shown in this embodiment, the hand alignment mechanism may also have approximately the same width, for example ¾ to 1¼ inches, as the handle's upper member. Finally, as with the alignment mechanism 220 on the primary grip area 210, the alignment mechanism 225 may be formed integrally with either the core portion 211B or overlay portion 207B material of secondary hand grip area 215, or be securely affixed thereto using a connecting means, for example, adhesive, screws, etc.

Thus, as illustrated in the embodiment of FIGS. 2A-2C, the handle 109 may be made of a two separate pieces, a core portion 211 and an overlay portion 207. The handle 209 may include two hand grip areas, a first hand grip area 210 and a second hand grip area 215, each including a hand alignment mechanism, first hand alignment mechanism 120 and second hand grip alignment mechanism 220 and 225, respectively. The hand grip alignment mechanism 220 may be formed in multiple sections, a portion with the core portion area 211A and a portion with overlay portion area 207A. Further, the grip alignment mechanism 225 may be formed integral with the outer overlay portion area 207B. However, once again, multiple types of materials may be used in various configurations for the core portion 211 and the overlay portion 207 of the handle 209 and the hand alignment mechanisms 220 and 225 may be formed independently of various materials.

Figure 3A:
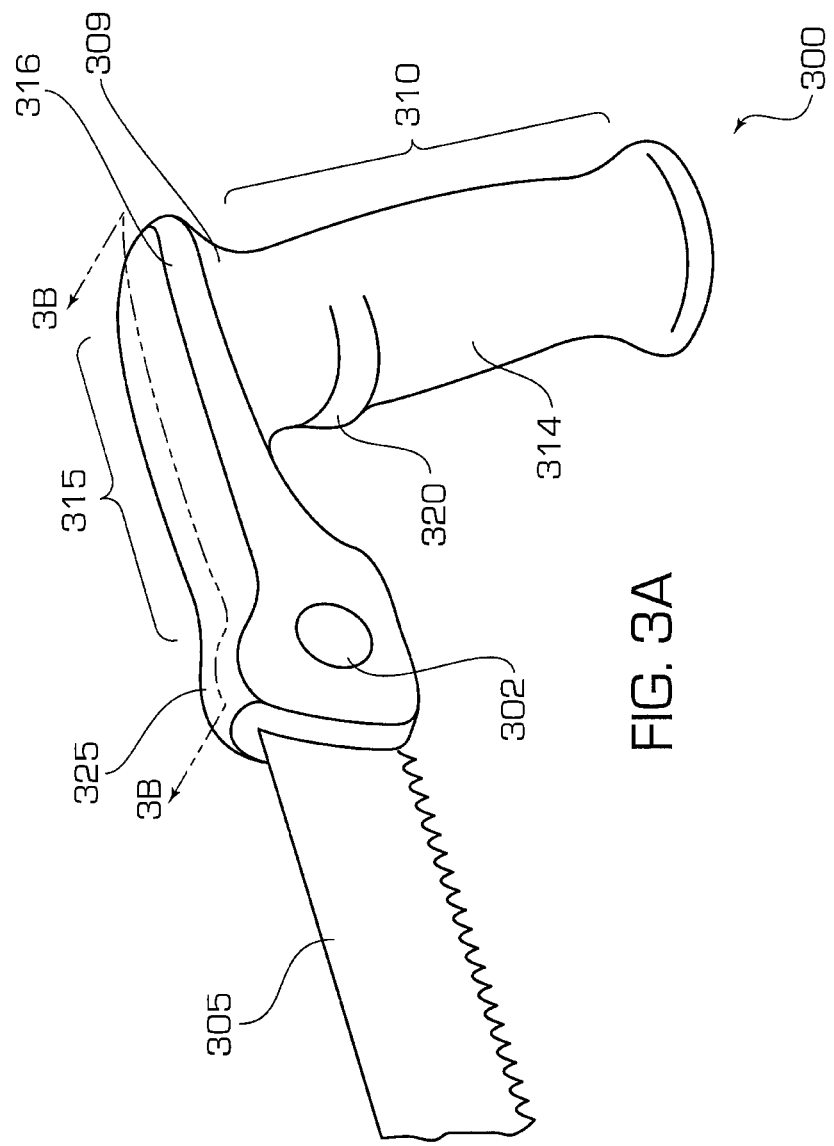
FIG. 3A is a perspective view of a handle that depicts a further exemplary embodiment of the present invention.
Figure 3B:
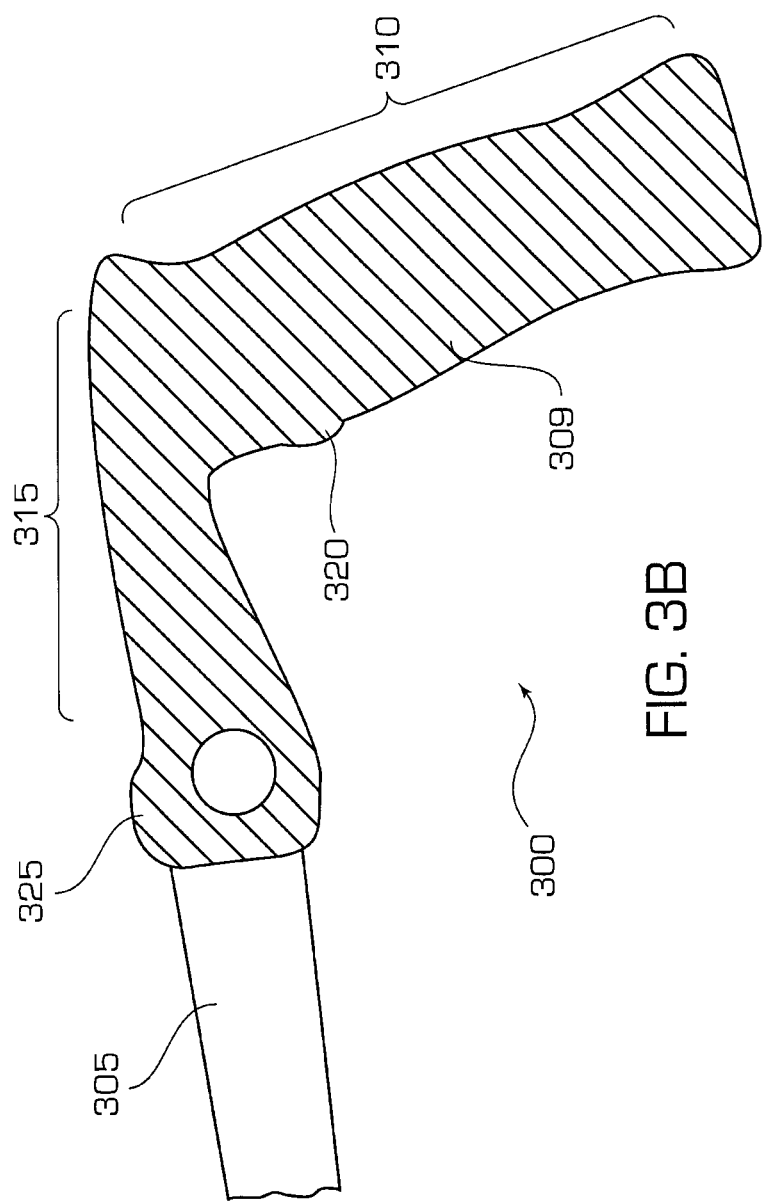
FIG. 3B is a cross sectional view of the handle of FIG. 3A taken across section lines 3B-3B, according to one exemplary embodiment of the present invention.

Referring now to FIGS. 3A-3B, another embodiment of the invention is provided. In this embodiment the partial perspective view 300 shows a handle 309 attached to an object 305 for movement. In this case the handle 309 is simplified by limiting the number over vertical and horizontal members to one each. As illustrated, the handle 309 has one horizontal member 316 coupled to the object 305 with one attachment means, 302, for example, a screw, rivet, bolt, etc. Further, the handle 309 may have a single vertical member 314 that is approximately perpendicular with horizontal member 316. The vertical member 314 may include a first hand grip area, for example, primary grip area 310. The horizontal member 316 may include a second hand grip area, for example, primary grip area 315. The primary hand grip area 310 may include a hand alignment mechanism 320. The secondary hand grip area 315 may also have a hand alignment mechanism 325. The handle 309 may be symmetrical about the plane taken along line 3B-3B as with the previous embodiments. As such, the right side may be a mirror image of the left side of the handle.

As illustrated, in this embodiment the hand alignment mechanism 320 may be similar in shape, contour, location and purpose to the hand alignment mechanism 120 shown in FIGS. 1A-1C. For example, the hand alignment mechanism may be a raised bump protruding from the forward and side surfaces of the primary hand grip area 310 which is greater in height at its center than is ends. As such, the alignment mechanism 320 may fade into the normal curved surface of the primary hand grip area 310 along is sides. As shown, the hand alignment mechanism 320 may have a width that is approximately the same throughout its length. Further, the hand alignment mechanisms 320 may be located at approximately ¼ to ⅓ of the total length down the primary hand grip area 310 from the upper member 316 and secondary hand grip area 315 and fit comfortably between the index finger and middle finger of a user's hand when grasping the handle 309. The location of the hand alignment mechanism 320 may be varied to be located between other groups of fingers or to bound the sides of the user's hand. More than one hand alignment mechanisms may also be used along the primary hand grip area 310.

The handle 309 may have multiple hand grip areas that may be made more compact by locating them close to one another. For example, at least a portion of the secondary hand grip area 315 may overlap at least a portion of the primary hand grip area 310. As illustrated in FIGS. 3A and 3B, the top end of primary hand grip area 310 may be overlapped by the rear end of secondary hand grip area 315.

In this embodiment, the hand alignment mechanism 325 associated with secondary hand grip area 315 may be similar in shape, contour, location and purpose to the hand alignment mechanism 125 shown in FIGS. 1A-1C. The hand alignment mechanism 325 may be formed at the end of the secondary hand grip area 315 closest to the object 305 to be moved and may be a bump or ridge protruding from the upper surface thereof. In one variation, the hand alignment mechanism 325 may be, for example, in a range of approximately ⅛-⅜ of an inch in height and a range of approximately ⅜-1 inch in length, with a width approximately the same as that of the handle 309.

As illustrated best in FIG. 3B, a cross-sectional view taken across line 3B-3B, the handle 309 may be made of a single material, for example, wood, metal, plastic, ceramic, etc., and the hand alignment mechanism 320 and hand alignment mechanism 325 may be integral to the handle 309 material. Although, in some variations, the handle 309 may be of one material and one or more of the hand alignment mechanisms may be made of a different material and affixed to the handle 309. For example, the handle 309 may be made of a wood and/or plastic, and the hand alignment mechanism may be made of rubber or metal.

Figure 4C:
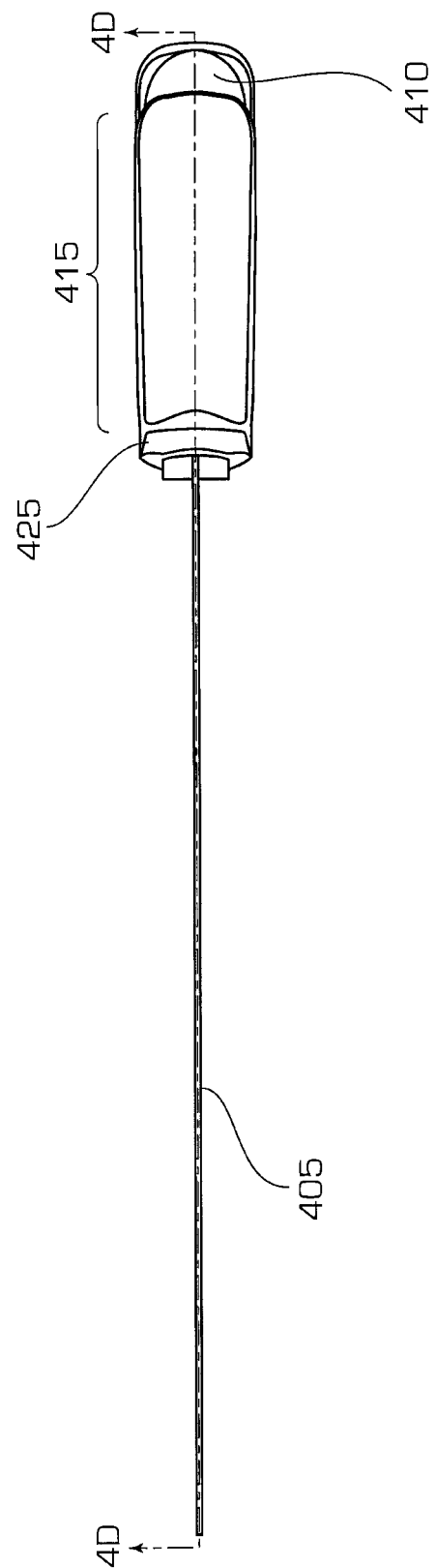
FIG. 4C is a top plan view of the panel saw of FIG. 4A.
Figure 4D:
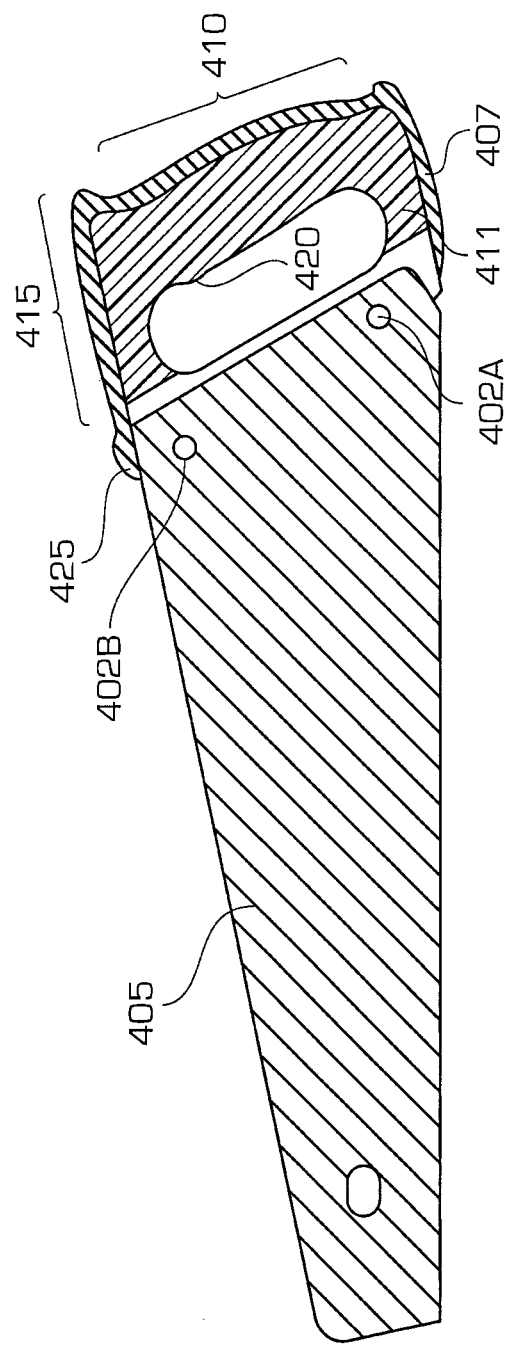
FIG. 4D is a cross-sectional view of the panel saw of FIG. 4A.

Referring now to FIGS. 4A-4D, another embodiment of the present invention will be described. The invention in this case is illustrated as a manual hand saw, panel saw 400. FIG. 4A shows a perspective view of the panel saw 400 as viewed from above and to the rear of the panel saw 400. FIG. 4B is an elevational view of the panel saw 400 of FIG. 4A as viewed from the left side. Although not shown, the right side view may be a mirror image of the left side view. FIG. 4C is a top plan view of the panel saw 400 of FIG. 4A. Finally, FIG. 4D is a cross-sectional view of the panel saw 400 of FIG. 4C looking inward from the plane formed by cutting the panel saw 400 along line 4D-4D.

The panel saw 400 includes an elongated saw blade 405 connected to a handle 409 with, for example, screw head rivets 402A and 402B. In this case, the handle 409 is comprised of a core portion 411 made of, for example, wood, and an overlay portion 407 made of, for example, rubber. The overlay portion 407 may be removably attached to the core portion 411 by the screw head rivets 402A and 402B. The handle 409 is comprised of four members; forward vertical, rear vertical, upper horizontal member, and a lower horizontal member arranged in a parallelogram with a center opening or hand insertion hole for inserting at least one hand of a user desiring to use the panel saw 400. The rear member includes a first hand grip area, primary hand grip 410 and the upper member includes a second hand grip area, secondary hand grip are 415. The center line of the primary hand grip area 410 may be at an angle of approximately 90 to 100 degrees with the center line of the secondary hand grip 415, as most clearly shown in FIGS. 4B and 4D. Further, the primary hand grip 410 has a hand alignment mechanism 420 that includes a forward portion 420A formed integral with core portion 411 (see FIG. 4D) and side portions 420B (one on the left side as shown in FIG. 4B, right side not shown) integrally formed on the surface overlay portion 407. Finally, as best shown in FIG. 4D, a second hand alignment mechanism 425 is formed integrally with the overlay portion 407 at a forward end of the secondary hand grip 415.

This embodiment is similar to the embodiment shown in FIGS. 2A-2C, and may have similar size and location for the various components. For example, the first hand alignment mechanisms (220 and 420) formed on the primary hand grip areas (210 and 410) include three portions, a forward portion and two side portions. However, the shape of the side portions of the hand alignment mechanism 420 is different having an elongated oval shape with a rounded front portion and a pointed rear portion. Although the front portion of the side portion 420B protrudes more than the rear portion, the rear portion is still somewhat raised from the normal surface of the handle 409 and does not fade into the handle 409. On the other hand, the second hand alignment mechanism 425 of the present embodiment is very similar in shape, size, and location as in the second embodiment as best illustrated in FIG. 4D. Although, its shape does have a somewhat flat top section near its center.

Figure 5F:
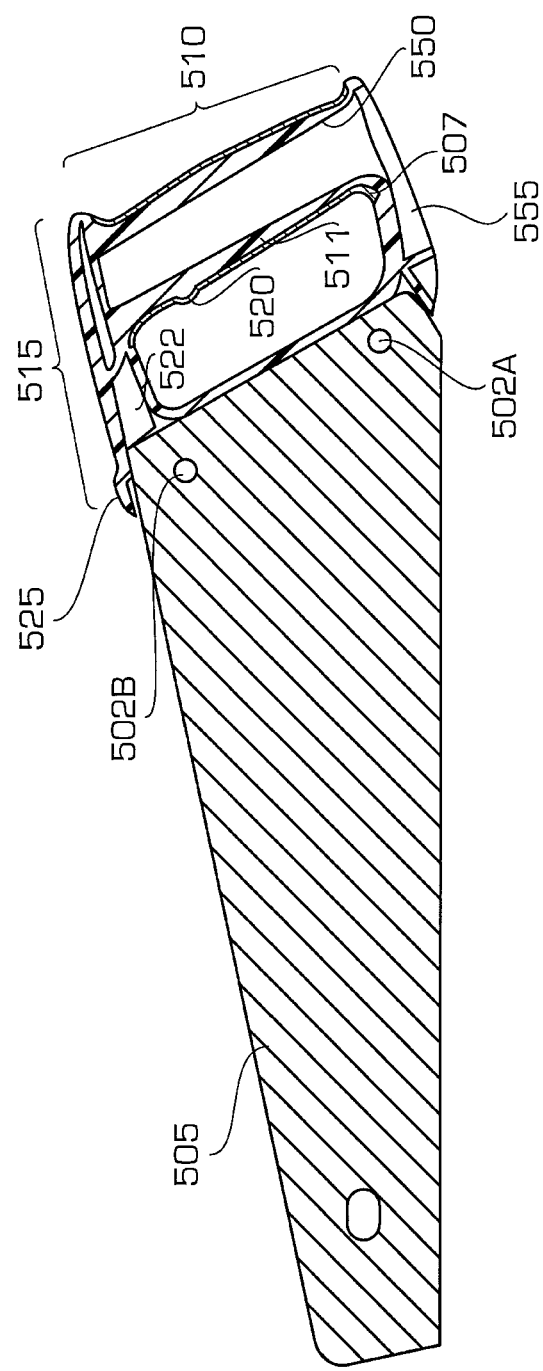
FIG. 5F is a cross-sectional view of the panel saw of FIG. 5A.

Referring now to FIGS. 5A-5E, another embodiment of the present invention will be described. The invention in this case is illustrated as a manual hand saw, panel saw 500. FIG. 5A shows a perspective view of the panel saw 500 as viewed from above and to the rear of the panel saw 500. FIG. 5B shows a perspective view of the panel saw 500 as viewed from above and to the front of the panel saw 500. FIG. 5C is a partial elevational view of the panel saw 500 of FIG. 5A as viewed from the left side. Although not shown, the right side view may be a mirror image of the left side view. FIG. 5D is a partial top plan view of the panel saw 500 of FIG. 5A. FIG. 5E is a partial bottom plan view of the panel saw 500 of FIG. 5A. Finally, FIG. 5F is a cross-sectional view of the panel saw 500 of FIG. 5D looking inward from the plane formed by cutting the panel saw 400 along line 5D-5D. This embodiment have a number of unique aspects including multiple forward members, a hollow handle, and a rubber grip with an integral hand alignment mechanism that may surround the entire outer surface of at least one hand grip area.

The panel saw 500 includes an elongated panel saw blade 505 connected to a handle 509 with, for example, screw head rivets 502A and 502B. In this case, the handle 509 is comprised of a frame portion 511 made of, for example, plastic and/or metal, and a hand grip overlay portion 507 made of, for example, rubber, plastic and/or foam rubber. The overlay portion 507 may completely surround at least one of the hand grip areas on the handle 509. For example, the overlay portion 507 may be made of a rubber material, foam rubber, or plastic that is molded around the entire primary hand grip area 507. Further, a first hand alignment mechanism 520 may be integrally formed with the overlay portion 507 and have the shape of an elongated oval with a maximum height from the surface of the overlay portion 507 on the forward surface of the primary hand grip area 510 and minimum height on the sides of the primary hand grip area 510. In one variation, the contour of hand alignment mechanism 520 may be formed integral to the frame portion 511 and the overlay portion 507 may form fit to the contour of the frame portion 511.

The handle 509 is comprised of five members; two forward vertical members, a rear vertical member, upper horizontal member, and a lower horizontal member, arranged in an approximate parallelogram with a center opening or hand insertion hole for inserting at least one hand of a user desiring to use the panel saw 500. An open area is formed between the two forward vertical members, first and forward most vertical member 511A and second forward member 511B. The first forward member 511A operates as a guide and lateral retainer for saw blade 505. The second forward member 511B operates as a horizontal stop and retainer for one end of the saw blade 505. The rear vertical member includes a first hand grip area, primary hand grip 510, and the upper horizontal member includes a second hand grip area, secondary hand grip are 515. The center line of the primary hand grip area 510 may be at an angle of approximately 90 to 100 degrees with the center line of the secondary hand grip 515, as most clearly shown in FIGS. 5C and 5F. Further, as previously noted the primary hand grip 510 has hand alignment mechanism 520 integrally formed on the surface of overlay portion 507 as most clearly shown in FIG. 5E. Finally, as best shown in FIG. 5E, a second hand alignment mechanism 525 is formed at a forward end of the secondary hand grip 515 and integral with the frame portion 511.

The handle 509 may be made formed so as to have interior hollow areas for reduced weight and cost. For example, as shown in FIG. 5B, the upper member that includes the secondary hand grip 515 has a plurality of cavities such as forward cavity 522. Other cavities include the opening/cavity 555 in the bottom of the handle 509 and the interior cavity 550 of the primary hand grip area 510. (See FIGS. 5E and 5F.)

Figure 6F:
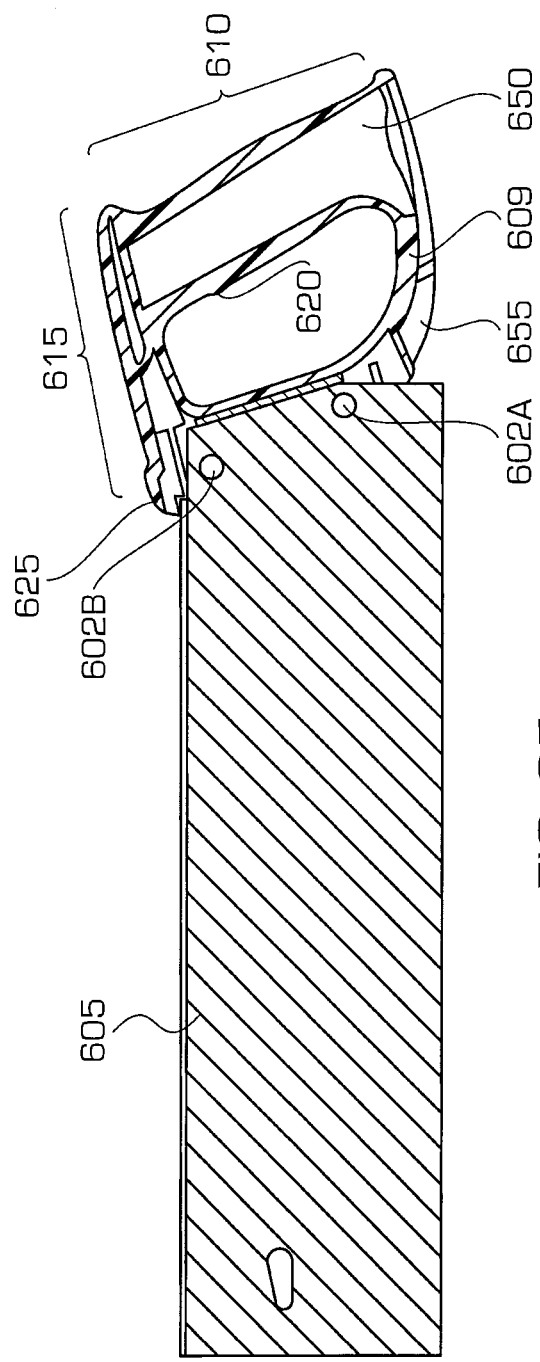
FIG. 6F is a cross-sectional view of the back saw of FIG. 6A.

Referring now to FIGS. 6A-6G, another embodiment of the present invention will be described. The invention in this case is illustrated as a manual hand saw, back saw 600. FIG. 6A shows a perspective view of the back saw 600 as viewed from above and to the rear of the back saw 600. FIG. 6B shows a perspective view of the back saw 600 as viewed from above and to the front of the back saw 600. FIG. 6C is a partial elevational view of the back saw 600 of FIG. 6A as viewed from the left side. Although not shown, the right side view may be a mirror image of the left side view. FIG. 6D is a partial top plan view of the back saw 600 of FIG. 6A. FIG. 6E is a partial bottom plan view of the back saw 600 of FIG. 6A. FIG. 6F is a cross-sectional view of the back saw 600 of FIG. 6D looking inward from the plane formed by cutting the panel saw 400 along line 6F-6F. Finally, FIG. 6G is a partial elevational view of a variation of the back saw of FIG. 6A as viewed from the left side of FIG. 6A. This embodiment, like the previous panel saw embodiment, has a number of unique aspects including multiple forward members and a hollow handle. Further, this embodiment handle 609 may have some portions with a similar contour to the previous panel saw embodiment. However, in this embodiment the hand alignment mechanisms are formed integral with the base handle structure and material and the forward members and lower lateral member may be varied to properly be used for a back saw.

The back saw 600 includes an elongated back saw blade 605 connected at one end to a handle 609 with, for example, screw head rivets 602A and 602B. In this case, the handle 609 may be comprised of a single material structure made of, for example, plastic and/or metal. The handle 609 is in this embodiment, as in the last embodiment, comprised of five members; two forward vertical members, a rear vertical member, an upper horizontal member, and a lower primarily horizontal member, arranged in an approximate parallelogram with a center opening or hand insertion hole for inserting at least one hand of a user desiring to use the panel saw 500. Although, in this embodiment the lower primarily horizontal member is curved upward for a good part of its length so as to properly accommodate a back saw application. Further, an open area is formed between the two forward vertical members, first and forward most vertical member 611A and second forward member 611B. The first forward member 611A operates as a guide and lateral retainer for saw blade 605. The second forward member 611B operates as a horizontal stop and retainer for one end of the saw blade 605. The rear vertical member includes a first hand grip area, primary hand grip 610, and the upper horizontal member includes a second hand grip area, secondary hand grip are 615. The vertical center line of the primary hand grip area 610 may be at an angle of approximately 90 to 110 degrees with the horizontal center line of the secondary hand grip 615, as most clearly shown in FIGS. 6C and 6F.

Further, a first hand alignment mechanism 620 may be integrally formed on the forward surface of the primary hand grip area 610 with a maximum distance above the normal surface of the primary hand grip area at the centerline of the forward most surface of the primary hand grip area 620 and tapering to a minimum height on the sides of the primary hand grip area 610 in a range of, for example, 90 to 180 degrees about the center line. As illustrated in this embodiment, hand alignment mechanism may have an elongated oval shape with relative sharp corners at its ends. The maximum height of the hand alignment mechanism 620 may be in a range of, for example, approximately 1/16 to 3/8 inch above the normal surface. Further, the hand alignment mechanism 620 may have a maximum width at the primary hand grip area 620 forward most center line in the range of, for example, approximately 3/16 to 3/8 an inch. In one variation, the contour of hand alignment mechanism 620 may be formed integral to the base handle structure and material and the handle 609 may be created using, for example, a molding process. Although this embodiment shows the use of an elongated oval shape for the hand alignment mechanism 620, it may have any number of shapes, for example, the shapes discussed above for the previous embodiments.

A secondary hand grip area 615 is formed on the upper horizontal member and may include a second hand alignment mechanism 625 formed at a forward end of, and integral with, the base handle 609 structure and material. As in previous embodiment, the second hand alignment mechanism 625 may have a number of sizes and shapes having a height above the top surface of secondary hand grip area 615 of, for example, 3/16 to 5/16 of an inch. Further, the second hand alignment mechanism 625 may be formed in a ridge or plateau shape and have a back surface that is at an angle, for example, of close to or slightly greater than 90 to 110 percent relative to the top surface of the secondary hand grip area 615. The face of this angled surface and the forward surface of the hand alignment mechanism 625 may be, for example, slightly curved convex toward the rear of the handle 609.

The handle 609 may be made formed so as to have interior hollow areas for reduced weight and cost. For example, as shown in FIG. 6B, the upper member that includes the secondary hand grip 615 has a plurality of cavities such as forward cavity 622. Other cavities include the opening/cavity 655 in the bottom of the handle 609 and the interior cavity 650 of the primary hand grip area 610. (See FIGS. 5E and 5F.)

Finally, the primary grip area 610 and/or the secondary grip area 615 may include a matted or textured surface in the areas where a user's hand grasps the saw handle so as to provide more comfort than that of a smooth single material grip made of, for example, plastic or metal. The use of a matted or textured surface softens the feel of the handle to the user's hand. In one variation show in FIG. 6G, the primary grip area 610 is shown with a matted or textured finish 670 from the upper circumference line 660 to the lower circumference line 665. This can be created by a molding process using a matted or textured finish on the mold surface that forms the primary grip area 610. Alternatively, the matted or textured finish 670 might be created using a mechanical roughening process after the handle is formed. In any case, the look and feel of the matted or textured finish 670 may feel more soft to the human touch than a smooth surface. In particular, when the saw handle is made from, for example plastic, the matted or textured finish 670 may even appear to an untrained eye and hand to have the look and feel of a rubber surface at a fraction of the cost to manufacture.

Figure 7B:
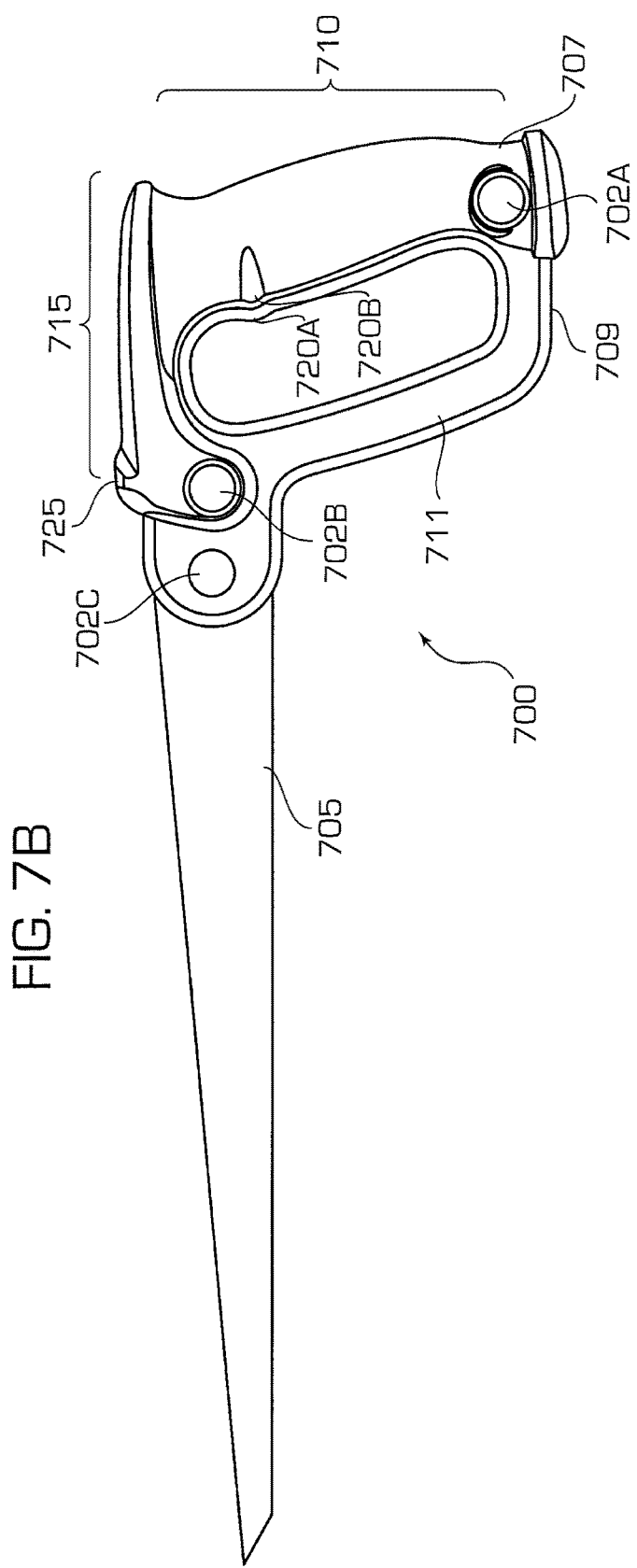
FIG. 7B is an elevational view of the compass saw of FIG. 7A viewed from the left side of FIG. 7A.
Figure 7C:
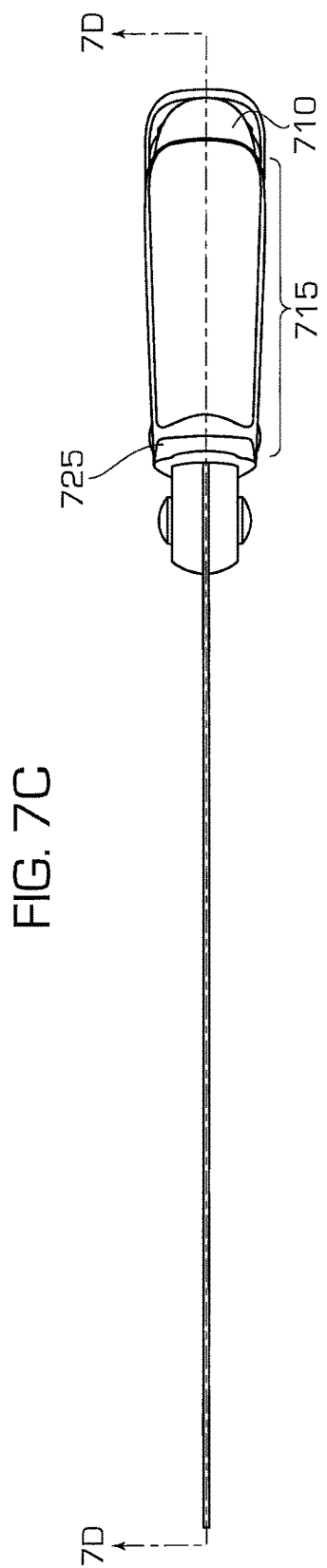
FIG. 7C is a top plan view of the panel saw of FIG. 7A.
Figure 7D:
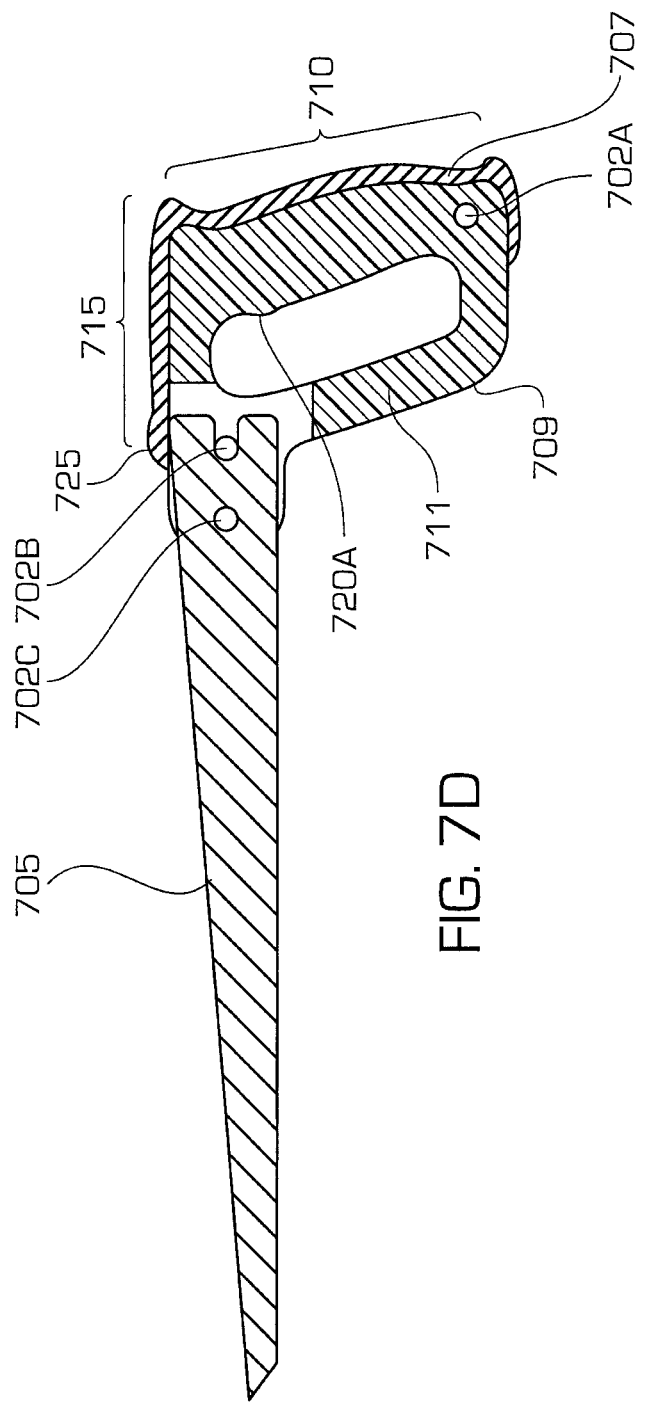
FIG. 7D is a cross-sectional view of the panel saw of FIG. 7A.

Referring now to FIGS. 7A-7D, another embodiment of the present invention will be described. The invention in this case is illustrated as a manual hand saw, compass saw 700. FIG. 7A shows a perspective view of the compass saw 700 as viewed from above and to the rear of the compass saw 700. FIG. 7B is an elevational view of the compass saw 700 of FIG. 7A as viewed from the left side. Although not shown, the right side view may be a mirror image of the left side view. FIG. 7C is a top plan view of the compass saw 700 of FIG. 7A. Finally, FIG. 7D is a cross-sectional view of the panel saw 700 of FIG. 7C looking inward from the plane formed by cutting the panel saw 700 along line 7D-7D.

The compass saw 700 includes an elongated saw blade 705 connected to a handle 709 with, for example, screw head rivets 702B and 702C or rivet 702B alone. The handle of this embodiment is similar to the handle in the embodiment shown in FIGS. 3A and 3B, but includes a forward vertical member and multi-layer handle design. In this case, the handle 709 is comprised of a core portion 711 made of, for example, wood or metal, and an overlay portion 707 made of, for example, rubber, plastic, foam rubber, etc. The overlay portion 707 may be removably attached to the core portion 711 by the screw head rivets 702A and 702B. The handle 709 is comprised of four members; a forward vertical member, rear vertical member, an upper horizontal member, and a lower horizontal member arranged in approximately a parallelogram with a center opening or hand insertion hole for inserting at least one hand of a user desiring to use the compass saw 700. The rear member includes a first hand grip area, primary hand grip 710 and the upper member includes a second hand grip area, secondary hand grip are 715. The center line of the primary hand grip area 710 may be at an angle of approximately 90 to 100 degrees with the center line of the secondary hand grip 415, as most clearly shown in FIGS. 4B and 4D. Of course this angle is appropriate for the compass saw application but the angle may vary to provide the best comfort and control for a particular saw or tool type. Further, the primary hand grip 710 has a hand alignment mechanism 720 that includes a forward portion 720A formed integral with core portion 711 (see, for example, FIG. 7D) and side portions 720B, one on the left side as shown in FIG. 7B and one on the right side (right side not shown), integrally formed on the surface overlay portion 707. Finally, as best shown in FIG. 7D, the secondary hand grip area 715 has a second hand alignment mechanism 725 that is formed integrally with the overlay portion 707 at a forward end of the secondary hand grip 715.

This embodiment is also similar to the multi-layer overlay handle embodiment shown in FIGS. 2A-2C, and may have similar size and location for the various components. For example, the first hand alignment mechanisms (220 and 720) formed on the primary hand grip areas (210 and 710) includes three portions, a forward portion and two side portions. However, the shape of the side portions of the hand alignment mechanism 720 is different having an elongated oval shape with a rounded front portion and a pointed rear portion (similar to the previous saw handle embodiment). Although the front portion of the side portion 720B protrudes more than the rear portion, the rear portion is still somewhat raised from the normal surface of the handle 709 and does not fade into the handle 709. On the other hand, the second hand alignment mechanism 725 of the present embodiment is very similar in shape, size, and location as in the second embodiment as best illustrated in FIG. 7D. Although, its shape does have a somewhat flat top section near its center.

Figure 8:
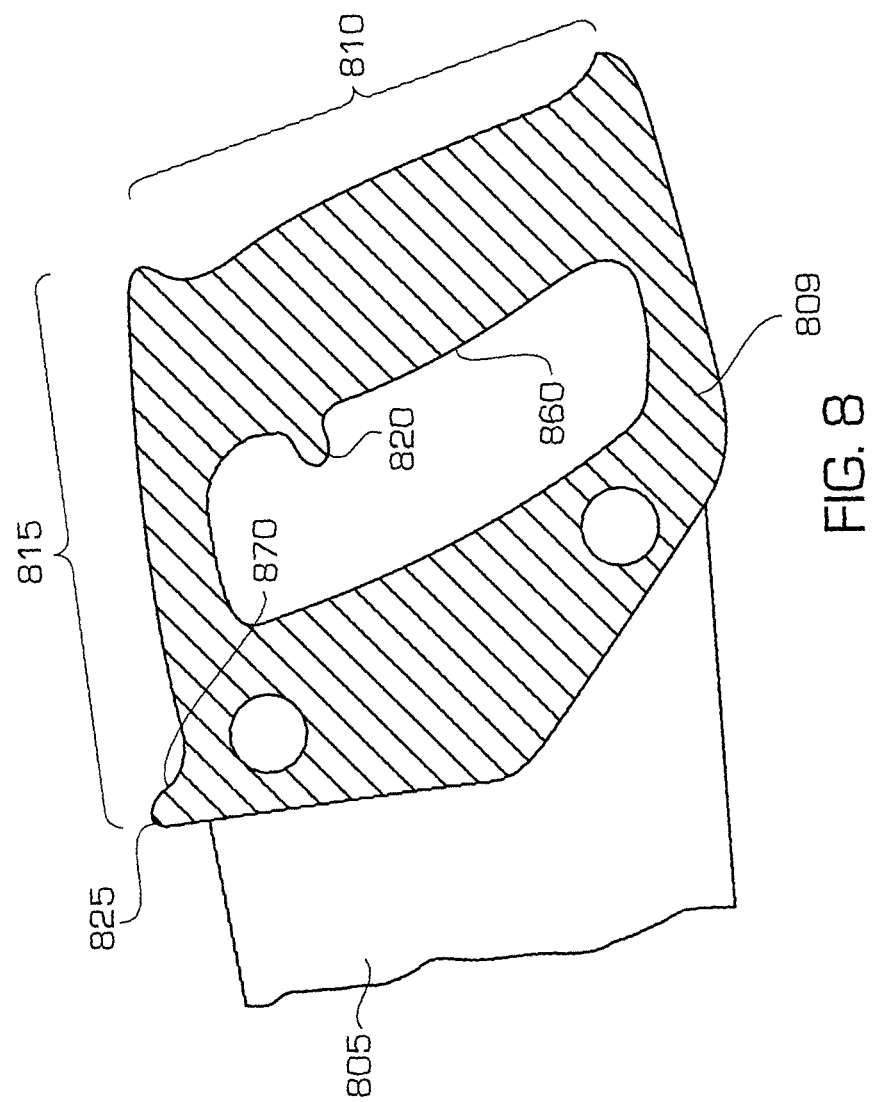
FIG. 8 provides a cross-sectional view indicative of another possible embodiment of the present invention.
Figure 9:
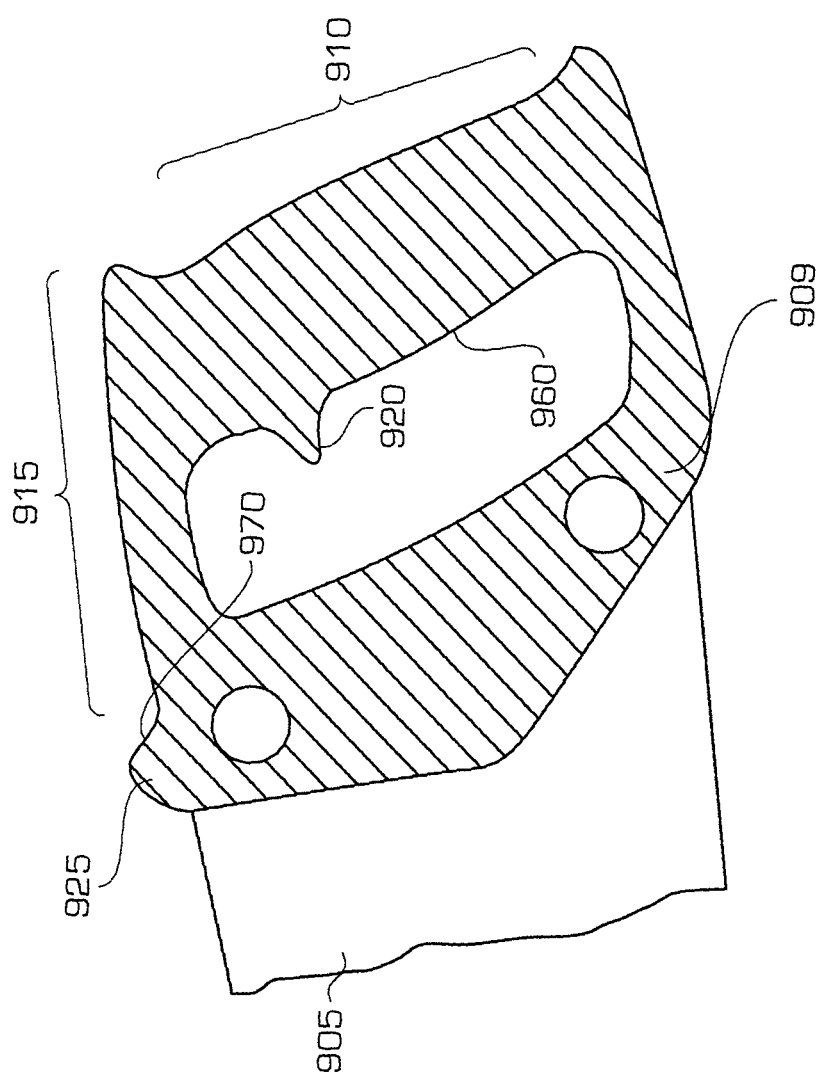
FIG. 9 provides a cross-sectional view indicative of another possible embodiment of the present invention.
Figure 10:
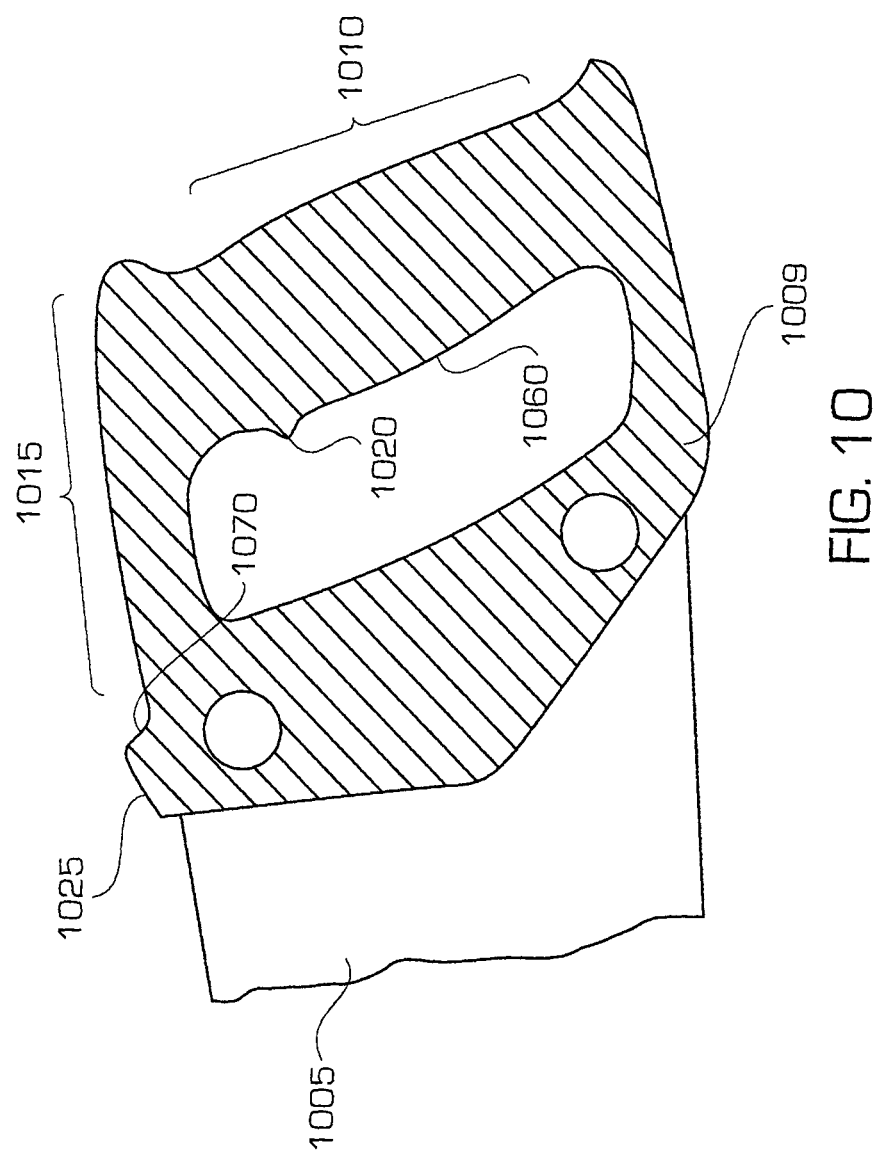
FIG. 10 provides a cross-sectional view indicative of another possible embodiment of the present invention.

As noted previously, the hand alignment mechanisms may have varying sizes and shapes to provide the proper ergonomics, comfort and control desired for the handle. FIGS. 8-10 give some examples of other possible cross-section variations that might be use for the invention. The embodiment of FIG. 8 is a cross-section view showing a handle 109 design including a different shape for a hand alignment mechanism 820 included in the primary hand grip area 810 and a different shape for a hand alignment mechanism 825 included in the secondary hand grip area 815. In this case, the hand alignment mechanism 820 is constructed with a much larger protrusion having reasonable long horizontal sides extending approximately perpendicular to the cylindrical outer surface 860 and a maximum height at the front centerline of the primary hand grip area 810. For example, the hand alignment mechanism 820 may have a height in the range of approximately ⅜ to ½ an inch so as to extend almost the full width of a user's grasping fingers wrapped around the primary hand grip area when using the saw. In addition, the forward most surface of the hand alignment mechanism 820 is in this case a concave curved surface. As with the previously described embodiments, this hand alignment mechanism 820 may have a shorter height and reduce in height to almost flat with, or fade into, the side surface of the primary hand grip area at, for example, approximately 90 to 180 degrees about the front centerline.

The secondary hand grip area 815 also has a more pronounced hand alignment mechanism 825. In this embodiment, the height of the hand alignment mechanism 825 is, for example, in the range of approximately ½ to ¾ of an inch above the top surface of the secondary hand grip area 815 and the rear facing slope 870 of the hand alignment mechanism 825 is in the range of, for example, approximately 90 to 110 degrees relative to the top surface of the secondary hand grip area 815. As such, this hand alignment mechanism 825 design may provide significant resistance for keeping a user's second hand from sliding off the top surface plane of the secondary hand grip area 815 during operation. Further, the hand alignment mechanism 925 of this embodiment has a steep slop on its front surface, being almost coincident with the forward most surface of the saw handle 809.

Referring now to FIG. 9, this embodiment shows a cross-section view of a handle 909 design including a different shape for a hand alignment mechanism 920 included in the primary hand grip area 910 and a different shape for a hand alignment mechanism 925 included in the secondary hand grip area 915. In this case, the hand alignment mechanism 920 is constructed with a much larger protrusion having reasonably long sides extending approximately 30 and 150 degrees from horizontal, respectively, to the cylindrical outer surface 960 so as to form a peak with one another and the peak having a maximum height at the front centerline of the primary hand grip area 910. As such, the hand alignment mechanism has approximately a triangular cross-sectional appearance with rounded corners that protrudes from the surface 960. For example, the hand alignment mechanism 920 may have a height in the range of approximately ⅜ to ½ an inch so as to extend almost the full width of a user's grasping fingers wrapped around the primary hand grip area when using the saw. In addition, the forward most surface of the hand alignment mechanism 920 is formed as a slightly rounded pointed surface. As with the previously described embodiments, this hand alignment mechanism 920 may have a shorter height and reduce in height to almost flat with, or fade into, the side surface of the primary hand grip area at, for example, approximately 90 to 180 degrees about the front centerline.

The secondary hand grip area 915 also has a more pronounced hand alignment mechanism 925. In this embodiment, the height of the hand alignment mechanism 925 is, for example, in the range of approximately ½ to ¾ of an inch above the top surface of the secondary hand grip area 915 and the rear facing slope 970 of the hand alignment mechanism 925 is in the range of, for example, approximately 90 to 135 degrees relative to the top surface plane of the secondary hand grip area 915. As such, this hand alignment mechanism 925 design may provide significant resistance for keeping a user's second hand from sliding off the top surface of the secondary hand grip area 915 during operation. Further, the hand alignment mechanism 925 of this embodiment has a more slight curved slop on its front surface. As a result, the hand alignment mechanism 925 may have roughly a triangular shape protruding from the top surface of the secondary hand grip area 915.

Referring now to FIG. 10, this embodiment shows a cross-section view of a handle 1009 design including a different shape for a hand alignment mechanism 1020 included in the primary hand grip area 1010 and a different shape for a hand alignment mechanism 1025 included in the secondary hand grip area 1015. In this case, the hand alignment mechanism 1020 is formed to more closely fit the contour of the valley that will appear between the fingers of a user's gripping hand. As illustrated, the hand alignment mechanism 1020 has slightly inward curved slope facing the upper member and a slightly outward curved slope facing the lower member of the handle 1009. As such, this a relatively small protrusion having relatively short height with sides extending approximately 45 and 135 degrees from horizontal, respectively, to the cylindrical outer surface 1060 so as to form a peak with one another and the peak having a maximum height at the front centerline of the primary hand grip area 1010, such that the hand alignment mechanism 1020 has approximately a triangular cross-sectional appearance with a sharp point projecting from the surface 1060. For example, the hand alignment mechanism 1020 may have a height in the range of approximately ⅛ to ⅜ an inch so as to approximately fill the valley area formed between the fingers of a user when the user's grasping fingers are comfortably wrapped around the primary hand grip area 1010 when using the saw. As with the previously described embodiments, this hand alignment mechanism 1020 may have a shorter height and reduce in height to almost flat with, or fade into, the side surface of the primary hand grip area at, for example, approximately 90 to 180 degrees about the front centerline.

The secondary hand grip area 1015 is somewhat similar to that of other embodiments but has a somewhat abrupt rear face, a gentle sloping forward face and moderate height. The hand alignment mechanism 1025 of this embodiment provides comfortable hand alignment and considerable resistance to unwanted horizontal hand movement during handle movement. In this embodiment, the height of the hand alignment mechanism 1025 is, for example, in the range of approximately ⅜ to ½ of an inch above the top surface of the secondary hand grip area 1015 and the rear facing slope 1070 of the hand alignment mechanism 1025 may be in the range of, for example, approximately 90 to 120 degrees relative to the top surface plane of the secondary hand grip area 1015. As such, this hand alignment mechanism 1025 design may provide significant resistance for keeping a user's second hand from sliding off the top surface of the secondary hand grip area 1015 during operation. Further, the hand alignment mechanism 1025 of this embodiment has a moderately slopped front face. As a result, the hand alignment mechanism 1025 may have roughly a low profile triangular shape protruding from the top surface of the secondary hand grip area 1015.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, although the hand alignment mechanism on the primary hand grip area is shown in the various embodiments as covering only up to 180 degrees of the circumference of the primary hand grip, one would appreciate that it might span more than 180 degrees, encircle, or nearly encircle the full circumference of the primary hand grip. In another variation, the hand alignment mechanism on the primary hand grip area may segregated into two sections each covering for example 30-90 degrees around the circumference of the primary hand grip. For example, in the two piece grip embodiments the hand alignment mechanism might be included only on the overlay material (e.g., rubber) material on the primary hand grip area and possibly only on a portion of the right and/or left side of the primary hand grip area. Other variations are also possible and would be similarly covered by the present invention as claimed even though not described as a detailed embodiment herein. As such, the features or functions shown and/or described with respect to one or more handle or saw herein may be included on any of the other saws or handles and be considered within the scope of the present invention.

What is claimed is:

1. A manually operated saw that performs sawing by a back and forth motion supplied by a user, comprising:
    a saw blade having at least one edge with a series of jagged teeth used for sawing;
    a handle connected to the saw blade and formed from a single loop of four members, where opposite members are approximately parallel and form a handle structure with only a single hand insertion hole, so that a first member of the four members is connected at one end directly to a second member, the second member is connected at one end directly to a third member, the third member is connected at one end directly to a fourth member, the fourth member is connected at one end directly to the first member, and the saw blade is coupled to the third member in such a way that a major axis of the saw blade and a major axis of the hand insertion hole are approximately perpendicular with each other, the top edge of the saw blade being adjacent and parallel to the second member and the bottom edge of the saw blade being adjacent and parallel to the fourth member;
    a first hand grip area formed from the first member of the four members, where the first hand grip area is substantially cylindrical in shape having a first side and a second side on either side of a forward center line and a top area and a bottom area at either ends of the substantially cylindrical shape which have a diameter that is less than that of a center area between the top area and the bottom area of the first hand grip area; and
    a second hand grip area formed from the second member of the four members, where a rear portion of the second hand grip area overlaps a top portion of the first hand grip area so that two hands of the user overlap one on the other when the handle is simultaneously gripped by the first hand grip area and the second hand grip area, the second hand grip area having a substantially flat engagement surface with a portion of the surface being wider than the first member and formed on an upper surface of a lateral length for supporting the full width of a user's fingers or palm when gripped and including a hand alignment means for designating a hand position to properly align gripping along the lateral length of the second hand grip area, the hand alignment means being a raised surface extending above the substantially flat engagement surface and located at a forward portion, opposite the rear portion, of the second hand grip area.

2. The manually operated saw of claim 1, wherein the raised surface of the second hand grip area is a protrusion extending above the substantially flat engagement surface and an inflection of more than 90 degrees angled away from the substantially flat engagement surface.

3. The manually operated saw of claim 1, wherein the substantially flat engagement surface has a different and varying width from one end to another end.

4. The manually operated saw of claim 1, wherein the top area of the first hand grip area has a diameter that is larger than the diameter of an opposite end at the bottom area of the first hand grip area.

5. A manual saw that performs sawing by a back and forth motion supplied by a user, the saw comprising:
    an elongated saw blade with cutting teeth; and
    a handle including:
        a first member having a first end and a second end;
        a second member having a first end and a second end, the first end of the second member connected directly to the first end of the first member so that the first member and the second member are approximately perpendicular with each other;
a third member and a fourth member connected to the first member and the second member to complete an approximate parallelogram and thereby form a handle frame structure having only a single hand through hole;
a first hand grip area formed from the first member with a lateral length for supporting the user's fingers or palm when gripped;
a second hand grip area formed from the second member with a lateral length for supporting the user's fingers or palm when gripped, the second hand grip area formed at a lateral distance close to the first end of the second member and the first hand grip area formed at a lateral distance close to the first end of the first member so that at least a portion of the second hand grip area overlap a portion of the first hand grip area whereby two hands of a user overlap one on the other when the handle is gripped simultaneously by the first hand grip area and the second hand grip area and including a hand alignment mechanism for designating a hand position to properly align gripping along the lateral length of the second hand grip area, wherein the hand alignment mechanism is a protrusion extending above the lateral length of the second hand grip area.

6. The saw of claim 5, wherein the second hand grip area has a substantially flat engagement surface.

7. The saw of claim 5, wherein the hand alignment mechanism on the second member is located at a portion of the second hand grip area having a lateral distance close to the second end of the second member so as to be at least in part at the end of the second member that is connected to saw blade.

8. The saw of claim 5, wherein the first hand grip area is substantially cylindrical in shape having a first side and a second side on either side of a forward center line and a top area and a bottom area at either ends of the substantially cylindrical shape which have a diameter that is less than that of a center area between the top area and the bottom area of the first hand grip area.

9. The saw of claim 5, wherein the first hand grip area includes a hand alignment bump for designating a hand position to properly align gripping along the lateral length of the first hand grip area.

10. The saw of claim 9, wherein the hand alignment bump being a single finger segregation bump formed so as to comfortably fit in an area between two non-thumb fingers of a user when the first hand grip area is gripped by a user.

11. A saw handle of a manually actuated saw, comprising:
a first member having a first end and a second end;
a second member having a first end and a second end, the first end of the second member connected directly to the first end of the first member so that the first member and the second member are approximately perpendicular with each other, and the second end of the second member connected to an object to be moved,
a first hand grip area formed from the first member;
a second hand grip area formed from the second member with a lateral length for supporting a user's fingers or palm when gripped, the second hand grip area formed at a lateral distance close to the first end of the second member and the first hand grip area formed at a lateral distance close to the first end of the first member so that at least a portion of the second hand grip area overlap a portion of the first hand grip area so that two hands of a user will overlap one on the other when the handle is gripped simultaneously by the first hand grip area and the second hand grip area, and a hand alignment mechanism included on the second member, wherein the hand alignment mechanism is a protrusion extending above the lateral length of the second hand grip area.

12. The handle of claim 11, wherein the first hand grip area is substantially cylindrical in shape having a first side and a second side on either side of a forward center line and the second hand grip area has a substantially flat engagement surface.

13. The handle of claim 11, wherein the hand alignment mechanism has an inflection of more than 90 degrees angled away from the lateral length of the second hand grip area.

14. The handle of claim 11, wherein the hand alignment mechanism is located at a portion of the second hand grip area having a lateral distance close to the second end of the second member so as to be at least in part at the end of the second member that is connected to the object to be moved.

15. The handle of claim 11, wherein at least a top portion of a top surface of the second grip area is wider than the first grip area where the first member and the second member are connected to each other.

16. The handle of claim 11, wherein the first hand grip area includes a hand alignment bump for designating a hand position to properly align gripping along a lateral length of the first hand grip area.

17. The handle of claim 16, wherein the hand alignment bump is a single finger segregation bump formed so as to comfortably fit in an area between two non-thumb fingers of the user when the first hand grip area is gripped by the user.

18. The handle of claim 17, wherein the single finger segregation bump is located at a top portion of the first hand grip area at a distance of approximately ¼ to ⅓ a lateral distance of the first member measured from the end of the first member that is connected to the second member.

19. The handle of claim 11, wherein the first hand grip area is substantially cylindrical in shape having a first side and a second side on either side of a forward center line and a top area and a bottom area at either ends of the substantially cylindrical shape which have a diameter that is less than that of a center area between the top area and the bottom area of the first hand grip.

20. The handle of claim 11, further comprising: a third member and a fourth member connected to the first member and the second member to complete an approximate parallelogram and thereby form a handle frame structure having only a single hand insertion hole.

* * * * *